(12) United States Patent
Toshioka

(10) Patent No.: US 11,996,575 B2
(45) Date of Patent: May 28, 2024

(54) ENERGY STORAGE APPARATUS

(71) Applicant: GS Yuasa International Ltd., Kyoto (JP)

(72) Inventor: Yoshimasa Toshioka, Kyoto (JP)

(73) Assignee: GS YUASA INTERNATIONAL LTD., Kyoto (JP)

(*) Notice: Subject to any disclaimer, the term of this patent is extended or adjusted under 35 U.S.C. 154(b) by 721 days.

(21) Appl. No.: 17/253,555

(22) PCT Filed: Jun. 21, 2019

(86) PCT No.: PCT/JP2019/024689
§ 371 (c)(1),
(2) Date: Dec. 17, 2020

(87) PCT Pub. No.: WO2019/245022
PCT Pub. Date: Dec. 26, 2019

(65) Prior Publication Data
US 2021/0226293 A1 Jul. 22, 2021

(30) Foreign Application Priority Data

Jun. 22, 2018 (JP) ................................ 2018-119023

(51) Int. Cl.
*H01M 50/242* (2021.01)
*H01G 9/008* (2006.01)
(Continued)

(52) U.S. Cl.
CPC .......... *H01M 50/242* (2021.01); *H01G 9/008* (2013.01); *H01G 9/26* (2013.01);
(Continued)

(58) Field of Classification Search
CPC .. H01M 50/242; H01M 50/50; H01M 50/521; H01M 50/209; H01M 50/264;
(Continued)

(56) References Cited

U.S. PATENT DOCUMENTS

2014/0335393 A1 11/2014 Wada et al.
2015/0144409 A1 5/2015 Fujii
(Continued)

FOREIGN PATENT DOCUMENTS

JP 2013-191422 A 9/2013
JP 2014-232633 A 12/2014
(Continued)

OTHER PUBLICATIONS

International Search Report (ISR) (PCT Form PCT/ISA/210), in PCT/JP2019/024689, dated Sep. 17, 2019.

*Primary Examiner* — James Lee
(74) *Attorney, Agent, or Firm* — MCGINN I.P. LAW GROUP, PLLC

(57) ABSTRACT

In an embodiment, a plurality of energy storage devices arranged in a first direction, an adjacent member sandwiched between the energy storage devices, a holding member that holds the energy storage devices and the adjacent member, an insulating member sandwiched between the energy storage devices and the holding member, a bus bar, and a bus bar holding member that holds the bus bar and is arranged along the plurality of energy storage devices are provided, in which the bus bar holding member has an elastic deformation portion, and the elastic deformation portion abuts on one of the adjacent member and the insulating member, and presses the bus bar holding member against the other of the adjacent member and the insulating member.

20 Claims, 22 Drawing Sheets

(51) Int. Cl.
  *H01G 9/26*    (2006.01)
  *H01M 10/658*  (2014.01)
  *H01M 50/209*  (2021.01)
  *H01M 50/264*  (2021.01)
  *H01M 50/291*  (2021.01)
  *H01M 50/50*   (2021.01)
  *H01M 50/521*  (2021.01)

(52) U.S. Cl.
  CPC ....... *H01M 10/658* (2015.04); *H01M 50/209* (2021.01); *H01M 50/264* (2021.01); *H01M 50/291* (2021.01); *H01M 50/50* (2021.01); *H01M 50/521* (2021.01)

(58) Field of Classification Search
  CPC .. H01M 50/291; H01M 10/658; H01G 9/008; H01G 9/26

See application file for complete search history.

(56) References Cited

U.S. PATENT DOCUMENTS

| | | | |
|---|---|---|---|
| 2015/0333305 A1* | 11/2015 | Seki | H01M 10/625 429/152 |
| 2016/0036028 A1 | 2/2016 | Tsuruta et al. | |
| 2017/0141371 A1 | 5/2017 | Toshioka et al. | |
| 2018/0088179 A1 | 3/2018 | Ota et al. | |
| 2018/0151859 A1 | 5/2018 | Aizawa | |

FOREIGN PATENT DOCUMENTS

| | | |
|---|---|---|
| JP | 2015-056385 A | 3/2015 |
| JP | 2015-138604 A | 7/2015 |
| JP | 2016-033905 A | 3/2016 |
| JP | 2017-091675 A | 5/2017 |
| JP | 2017-091948 A | 5/2017 |
| JP | 2017-107801 A | 6/2017 |
| JP | 2017-199501 A | 11/2017 |
| JP | 2018-055843 A | 4/2018 |
| WO | WO 2013/084941 A1 | 6/2013 |
| WO | WO 2014/034079 A1 | 3/2014 |
| WO | WO 2017/006763 A1 | 1/2017 |

* cited by examiner

ENERGY STORAGE APPARATUS

CROSS-REFERENCE OF RELATED APPLICATIONS

The present application claims the priority of Japanese Patent Application No. 2018-119023, and the content of Japanese Patent Application No. 2018-119023 is incorporated by reference into the description of the present specification.

TECHNICAL FIELD

The present invention relates to an energy storage apparatus including a bus bar holding member that holds a bus bar.

BACKGROUND ART

Conventionally, a battery module in which a bus bar plate is assembled on the upper surface of a plurality of battery cells has been known (see Patent Document 1).

Specifically, as shown in FIG. 22, this battery module has a configuration in which a plurality of battery cells 801 are stacked with a first holder 802 made of synthetic resin and having an H-shaped cross section sandwiched between them, and two second holders 803 made of synthetic resin and having a U-shaped cross section are stacked on the outer side of the two battery cells 801 located at both ends in the stacking direction and fastened in the stacking direction by fastening means.

A positive terminal 8011 and a negative terminal 8012 are provided on the upper surface of each battery cell 801. The positive terminals 8011 and the negative terminals 8012 of a plurality of battery cells 801 are electrically connected in series by a bus bar plate 805.

The bus bar plate 805 has a flat frame-shaped member 806 and a plurality of bus bars 807 made of a metal plate. Each bus bar 807 connects the positive terminal 8011 and the negative terminal 8012 adjacent to each other in the stacking direction of the two adjacent battery cells 801 to each other.

The frame-shaped member 806 includes a main body portion 8061 extending in the longitudinal direction (stacking direction) at the center thereof, two vertical frames 8062 extending parallel on the left and right sides of the main body portion 8061, and a plurality of horizontal frames 8063 each connecting the main body 8061 and the vertical frame 8062. In the frame-shaped member 806, the bus bar 807 is fixed in the space surrounded by the main body portion 8061, the vertical frame 8062, and the horizontal frame 8063.

On the outer surface of each vertical frame 8062, a plurality of convex parts 8062a that are separated from each other at a constant distance in the stacking direction are projected. On the other hand, each first holder 802 includes a main body portion 8021 sandwiched between adjacent battery cells 801 and a pair of flange portions 8022 protruding from both ends of the main body portion 8021 in the stacking direction. A concave part 8022a is formed at the top of each flange portion 8022.

In this battery module 800, a plurality of left and right convex parts 8062a projecting from the pair of vertical frames 8062 are made to engage with a plurality of left and right concave parts 8022a formed in the pair of flange portions 8022 of the corresponding number of first holders 802, thereby assembling the bus bar plate 805 to the first holder 802.

In the above battery module 800, the bus bar plate 805 is not sufficiently fixed to the first holder 802 due to manufacturing errors such as the positions and sizes of the convex part 8062a and the concave part 8022a or the like, and the bus bar plate 805 may rattle when vibration is applied to the battery module 800. When the bus bar plate 805 to which the bus bar 807 is fixed rattles in this way, stress concentration occurs at the connection portion between the bus bar 807 and the terminals 8011 and 8012 of the battery cell 801, which may damage the connection portion between the bus bar 807 and the terminals 8011 and 8012.

PRIOR ART DOCUMENT

Patent Document

Patent Document 1: WO 2013/084941 A1

SUMMARY OF THE INVENTION

Problems to be Solved by the Invention

Therefore, an object of an embodiment is to provide an energy storage apparatus capable of suppressing rattling of the bus bar holding member.

Means for Solving the Problems

An energy storage apparatus of an embodiment includes:
a plurality of energy storage devices arranged in a first direction;
an adjacent member sandwiched between two adjacent energy storage devices among the plurality of energy storage devices;
a holding member that holds the plurality of energy storage devices and the adjacent member;
an insulating member sandwiched between the plurality of energy storage devices and the holding member;
a bus bar that electrically connects external terminals of the energy storage devices; and
a bus bar holding member that holds the bus bar and is arranged along the plurality of energy storage devices, in which
the bus bar holding member has an elastic member, and the elastic member abuts on one of the adjacent member and the insulating member, and presses the bus bar holding member against the other of the adjacent member and the insulating member.

MODE FOR CARRYING OUT THE INVENTION

Figure 1:
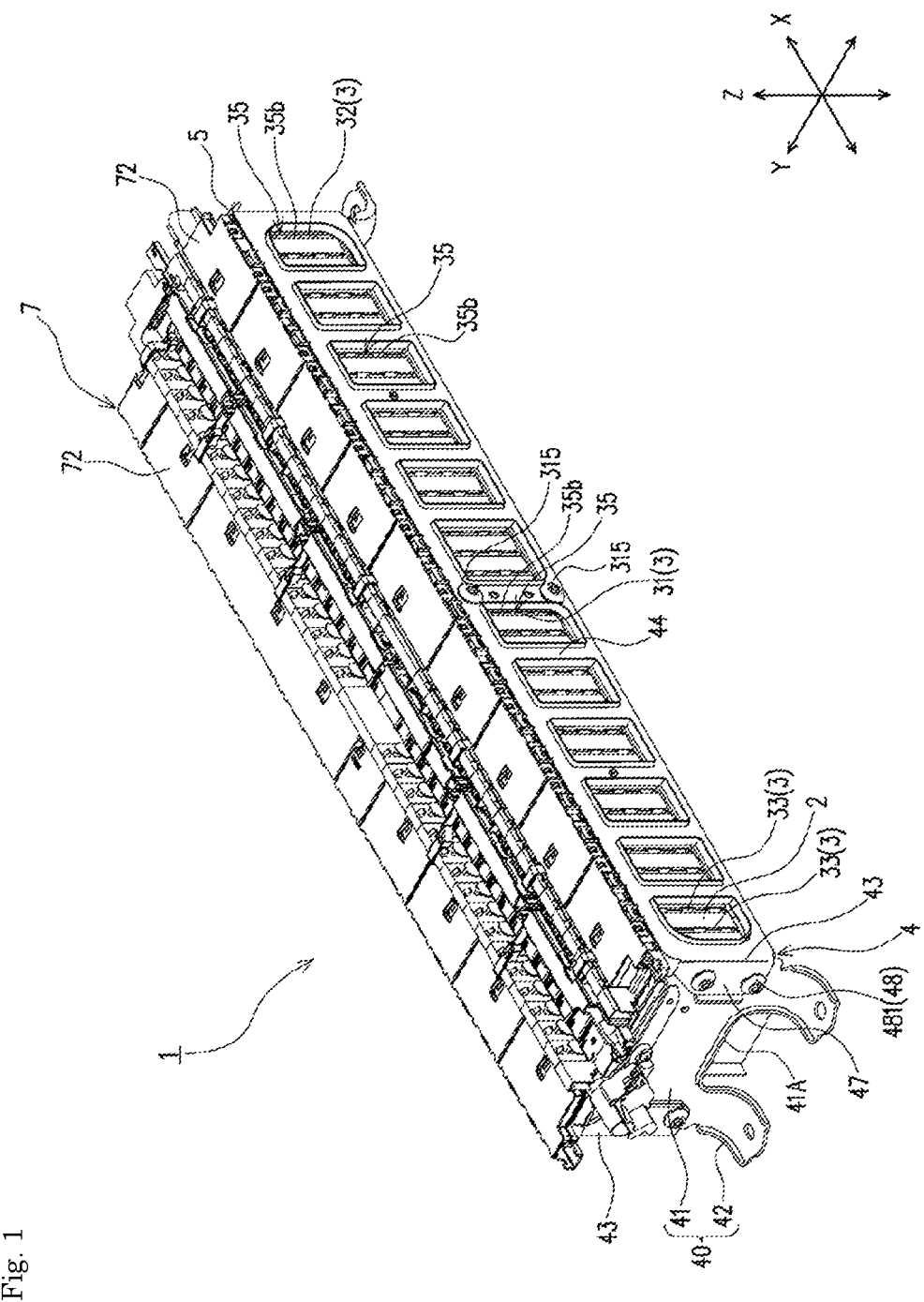
FIG. 1 is a perspective view of an energy storage apparatus according to an embodiment.
Figure 2:
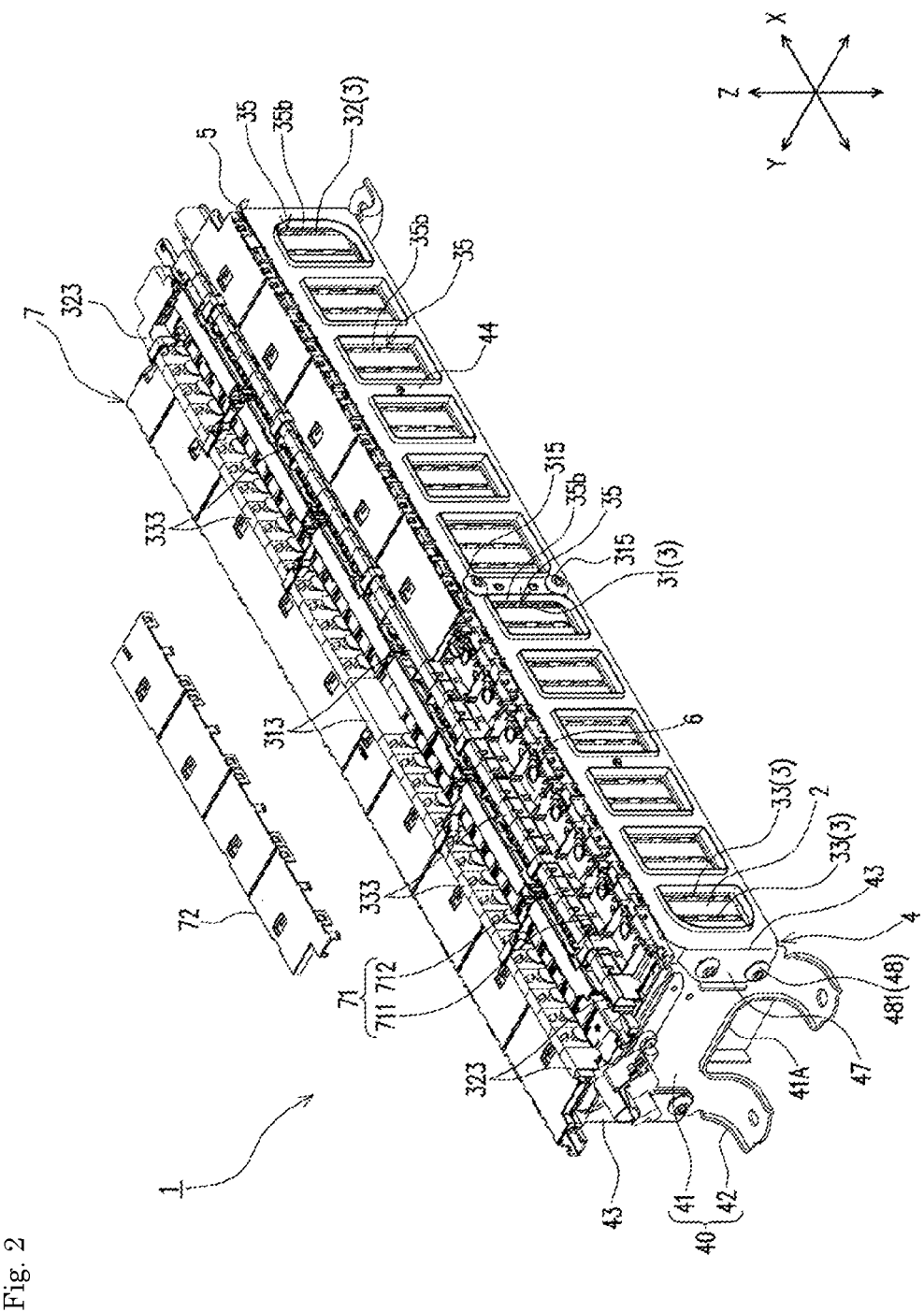
FIG. 2 is a perspective view of a bus bar holding member included in the energy storage apparatus in a state where a part of a plurality of lid portions is removed.

An energy storage apparatus of an embodiment includes:
a plurality of energy storage devices arranged in a first direction;
an adjacent member sandwiched between two adjacent energy storage devices among the plurality of energy storage devices;
a holding member that holds the plurality of energy storage devices and the adjacent member;
an insulating member sandwiched between the plurality of energy storage devices and the holding member;
a bus bar that electrically connects external terminals of the energy storage devices; and
a bus bar holding member that holds the bus bar and is arranged along the plurality of energy storage devices, in which
the bus bar holding member has an elastic deformation portion, and
the elastic deformation portion abuts on one of the adjacent member and the insulating member, and presses the bus bar holding member against the other of the adjacent member and the insulating member.

According to such a configuration, even if a manufacturing error or the like occurs in the distance between the bus bar holding member and the adjacent member or the insulating member, the elastic deformation portion absorbs the manufacturing error by the elastic deformation, and then can press the bus bar holding member toward the adjacent member or the insulating member by the elastic force caused by the elastic deformation. Therefore, rattling of the bus bar holding member can be suppressed regardless of the presence or absence of the manufacturing error.

In the energy storage apparatus,
the adjacent member may have a convex part, and
the elastic deformation portion may have a first regulating part that is located beside the convex part in the first direction and thereby regulates movement of the bus bar holding member in the first direction.

According to such a configuration, when the bus bar holding member moves or tries to move to the convex part side in the first direction, the abutment of the convex part on the first regulating part regulates the movement of the bus bar holding member in the first direction. That is, it is possible to suppress also the rattling of the bus bar holding member in the first direction by utilizing the elastic member that suppresses the rattling between the bus bar holding member and the adjacent member or the insulating member.

Further, in the energy storage apparatus,
the adjacent member may have a convex part, and
the elastic deformation portion may have a second regulating part that is located beside the convex part in a second direction that is a direction in which the bus bar and the energy storage device are arranged and is a direction orthogonal to the first direction, and thereby regulates movement of the bus bar holding member in the second direction.

According to such a configuration, when the bus bar holding member moves or tries to move to the convex part side in the second direction, the abutment of the convex part on the second regulating part regulates the movement of the bus bar holding member in the second direction. That is, it is possible to suppress also the rattling of the bus bar holding member in the second direction by utilizing the elastic deformation portion that suppresses the rattling between the bus bar holding member and the adjacent member or the insulating member.

The adjacent member may have an extension portion extending in the second direction, the convex part is arranged on the extension portion, and the elastic deformation portion may abut on the wall portion and press the bus bar holding member against the adjacent member.

According to such a configuration, even if there is a manufacturing error or the like in the distance between the bus bar holding member and the adjacent member, the elastic deformation portion absorbs the manufacturing error by the elastic deformation, and then can press the bus bar holding member toward the adjacent member by the elastic force caused by the elastic deformation. Therefore, rattling of the bus bar holding member can be suppressed regardless of the presence or absence of the manufacturing error.

Further, the energy storage apparatus of the present invention includes:
a plurality of energy storage devices arranged in a first direction;
an adjacent member sandwiched between two adjacent energy storage devices among the plurality of energy storage devices;
a holding member that holds the plurality of energy storage devices and the adjacent member;
an insulating member sandwiched between the plurality of energy storage devices and the holding member;
a bus bar that electrically connects external terminals of the energy storage devices; and
a bus bar holding member that holds the bus bar and is arranged along the plurality of energy storage devices, in which the adjacent member has an elastic member, and the elastic deformation portion abuts on the bus bar holding member and presses the bus bar holding member against the insulating member.

According to such a configuration, even if there is a manufacturing error or the like in the distance between the bus bar holding member and the insulating member, the elastic deformation portion absorbs the manufacturing error by the elastic deformation, and then can press the bus bar holding member toward the insulating member by the elastic force caused by the elastic deformation. Therefore, rattling of the bus bar holding member can be suppressed regardless of the presence or absence of the manufacturing error.

Further, the energy storage apparatus of the present invention includes:

a plurality of energy storage devices arranged in a first direction;

an adjacent member sandwiched between two adjacent energy storage devices among the plurality of energy storage devices;

a holding member that holds the plurality of energy storage devices and the adjacent member;

an insulating member sandwiched between the plurality of energy storage devices and the holding member;

a bus bar that electrically connects external terminals of the energy storage devices; and a bus bar holding member that holds the bus bar and is arranged along the plurality of energy storage devices, in which the insulating member has an elastic member, and the elastic deformation portion abuts on the bus bar holding member and presses the bus bar holding member against the adjacent member.

According to such a configuration, even if there is a manufacturing error or the like in the distance between the bus bar holding member and the adjacent member, the elastic deformation portion absorbs the manufacturing error by the elastic deformation, and then can press the bus bar holding member toward the adjacent member by the elastic force caused by the elastic deformation. Therefore, rattling of the bus bar holding member can be suppressed regardless of the presence or absence of the manufacturing error.

According to the above configuration, it is possible to provide an energy storage apparatus capable of suppressing rattling of the bus bar holding member.

Hereinafter, an embodiment of the present invention will be described with reference to FIGS. 1 to 15. The name of each constituent member (each constituent element) of the present embodiment is that in the present embodiment, and may differ from the name of each constituent member (each constituent element) in the background art.

Figure 3:
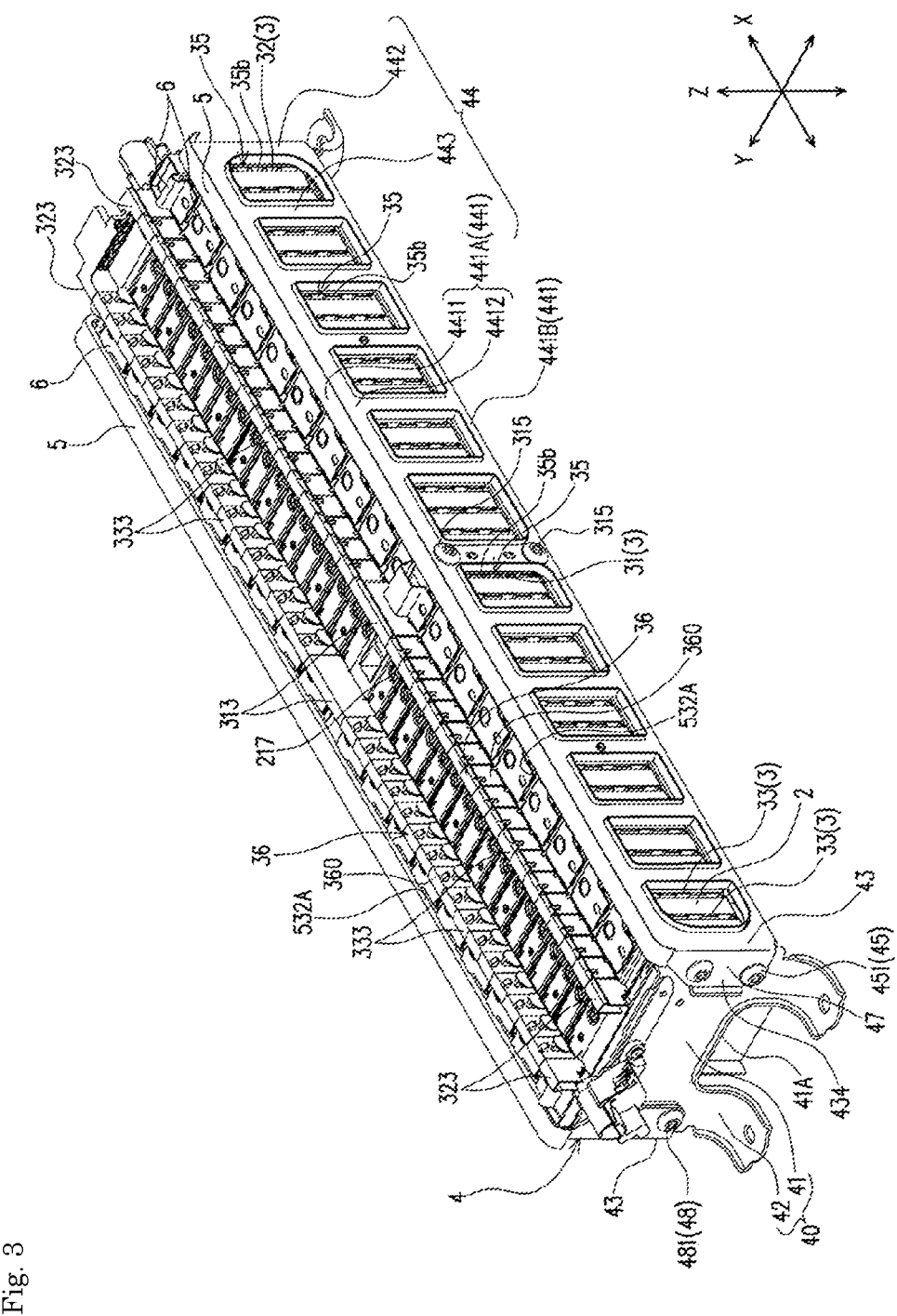
FIG. 3 is a perspective view of the energy storage apparatus in a state where the bus bar holding member is omitted.

As shown in FIGS. 1 to 4, the energy storage apparatus includes a plurality of energy storage devices 2 each having an external terminal 22 and arranged in a predetermined direction, a bus bar 6 that connects the external terminals 22 of different energy storage devices 2 in a conductive manner, a bus bar holding member 7 that holds the bus bar 6 and is arranged along the plurality of energy storage devices 2, and at least one member (two members in the example of the present embodiment) including a pair of facing surfaces (in the example of the present embodiment, an outer side surface 360 and an inner side surface 532A: see FIG. 3) that are located on both sides of at least a part of the bus bar holding member 7 and face each other. Further, in the energy storage apparatus 1 of the present embodiment, the members including the pair of facing surfaces are an adjacent member 3 adjacent to the energy storage device 2 and an insulator 5 arranged along the plurality of energy storage devices 2. Further, the energy storage apparatus 1 also includes a holding member 4 or the like that holds a plurality of energy storage devices 2.

The plurality of energy storage devices 2 are arranged in a predetermined direction. Each of these plurality of energy storage devices 2 is a primary battery, a secondary battery, a capacitor, or the like. The energy storage device 2 of the present embodiment is a nonaqueous electrolyte secondary battery that can be charged and discharged. More specifically, the energy storage device 2 is a lithium ion secondary battery that utilizes electron transfer generated by the movement of lithium ions. The energy storage device 2 is a so-called square lithium ion secondary battery.

Each of the plurality of energy storage devices 2 has an electrode assembly, a case 21 for accommodating the electrode assembly together with an electrolyte solution, and an external terminal 22 at least a part of which is exposed to the outside of the case 21.

The case 21 has a case body 211 having an opening, and a plate-shaped lid plate 216 that blocks (closes) the opening of the case body 211. The case body 211 of the present embodiment has a bottomed square tube shape, and the case 21 has a flat rectangular parallelepiped shape. The case body 211 includes a rectangular plate-shaped closing portion 212 and a tubular body portion (peripheral wall) 213 connected to the peripheral edge of the closing portion 212. The body portion 213 has a flat square tubular shape. The body portion 213 has a pair of long wall portions 214 extending from the long side at the peripheral edge of the closing portion 212, and a pair of short wall portions 215 extending from the short side at the peripheral edge of the closing portion 212. By connecting the corresponding end portions of the pair of long wall portions 214 to each other by the short wall portion 215, a flat square tubular body portion 213 is formed. The lid plate 216 is a rectangular plate-shaped member that blocks the opening of the case body 211. A pair of external terminals 22 is arranged at intervals on the lid plate 216. Further, the lid plate 216 has a gas release valve 217 capable of discharging gas in the case 21 to the outside. The gas release valve 217 discharges gas from inside the case 21 to the outside when the internal pressure of the case 21 rises to a predetermined pressure. The gas release valve 217 of the present embodiment is arranged between the pair of external terminals 22.

In the energy storage apparatus 1 of the present embodiment, the plurality of energy storage devices 2 are arranged in a state where the long wall portions 214 of the case 21 (case body 211) face each other.

In the following, the direction in which the plurality of energy storage devices 2 are arranged (first direction) is defined as the X axis of the Cartesian coordinate system, the direction in which the short wall portion 215 of the case body 211 faces (third direction) is defined as the Y axis of the Cartesian coordinate system, and the direction in which the closing portion 212 and the lid plate 216 face (second direction) is defined as the Z axis of the Cartesian coordinate system.

The bus bar 6 is a plate-shaped member having conductivity such as metal, and conducts the external terminals 22 of the energy storage devices 2 with each other. The bus bar 6 of the present embodiment includes the one having a plate shape along the X-Y plane (a plane including the X-axis and the Y-axis) and the one having a portion that is curved or bent so as to be convex in the Z-axis direction at an intermediate position in the X-axis direction. However, in each case, the contour shape seen from the Z-axis direction is rectangular.

A plurality of bus bars 6 (a number corresponding to the number of a plurality of energy storage devices 2) are provided in the energy storage apparatus 1. These plurality of bus bars 6 connect the external terminals 22 adjacent to each other in the X-axis direction in a conductive manner at each of a one-side end and the other-side end of the energy storage apparatus 1 in the Y-axis direction. In the energy storage apparatus 1 of the present embodiment, the plurality of bus bars 6 are arranged in the X-axis direction at one end in the Y-axis direction and also arranged in the X-axis direction at the other end in the Y-axis direction. Each bus bar 6 is welded to the external terminal 22 of the energy storage device 2.

Specifically, a plurality of bus bars 6 include a bus bar 6 that connects external terminals 22 arranged at one ends in the Y-axis direction of two energy storage devices 2 adjacent to each other in the X-axis direction, and a bus bar 6 that connects external terminals 22 arranged at the other ends in the Y-axis direction of two energy storage devices 2 adjacent to each other in the X-axis direction. These plurality of bus bars 6 connect (conduct) all of the plurality of energy storage devices 2 included in the energy storage apparatus 1 in series.

The adjacent member 3 is arranged between two energy storage devices 2 adjacent to each other in the X-axis direction, or between an energy storage device 2 at an endmost position in the X-axis direction and a member (in the example of the present embodiment, a part of the holding member 4) arranged in the X-axis direction with respect to the energy storage device 2. The adjacent member 3 is composed of a member having an insulating property such as resin. Further, the adjacent member 3 forms, between the adjacent member 3 and an adjacent energy storage device 2, a flow channel 35 through which a fluid for temperature adjustment of the energy storage device 2 can flow. The flow channel 35 of the present embodiment extends from an opening 35a formed at the end position (position corresponding to the closing portion 212 of the energy storage device 2) on the other side (lower side in FIG. 4) of the adjacent member 3 in the Z-axis direction, to openings 35b formed at the end positions (positions corresponding to the respective short wall portions 215 of the energy storage devices 2) on one side and the other side of the adjacent member 3 in the Y-axis direction. This flow channel 35 is bent at an intermediate position in the longitudinal direction. In addition, in the third adjacent member 33 of FIG. 1, the flow channel 35 and the openings 35a and 35b at the ends of the flow channel 35 are shown, but these configurations are formed in a state where the energy storage device 2 is adjacent to the third adjacent member 33.

In the following, an adjacent member 3 arranged between two adjacent energy storage devices 2 at a substantially central position of the energy storage apparatus 1 in the X-axis direction may be referred to as a first adjacent member 31, an adjacent member 3 adjacent to an energy storage device 2 at an outside (in the example of the present embodiment, between the holding member 4 and the energy storage device 2 at an endmost position) of the energy storage device 2 at the endmost position in the X-axis direction may be referred to as a second adjacent member 32, and an adjacent member 3 arranged between two adjacent energy storage devices 2 between the first adjacent member 31 and the second adjacent member 32 in the X-axis direction may be referred to as the third adjacent member 33.

In the energy storage apparatus 1 of the present embodiment, the first adjacent member 31 is arranged between the energy storage devices 2 at substantially the center position in the X-axis direction, the second adjacent member 32 is arranged on both outsides of a plurality of energy storage devices 2 arranged in the X-axis direction, and the third adjacent members 33 are respectively arranged between the energy storage devices 2 except for between the energy storage devices 2 where the first adjacent member 31 is arranged. That is, the energy storage apparatus 1 includes one first adjacent member 31, a pair of second adjacent members 32, and a plurality of third adjacent members 33.

Figure 5:
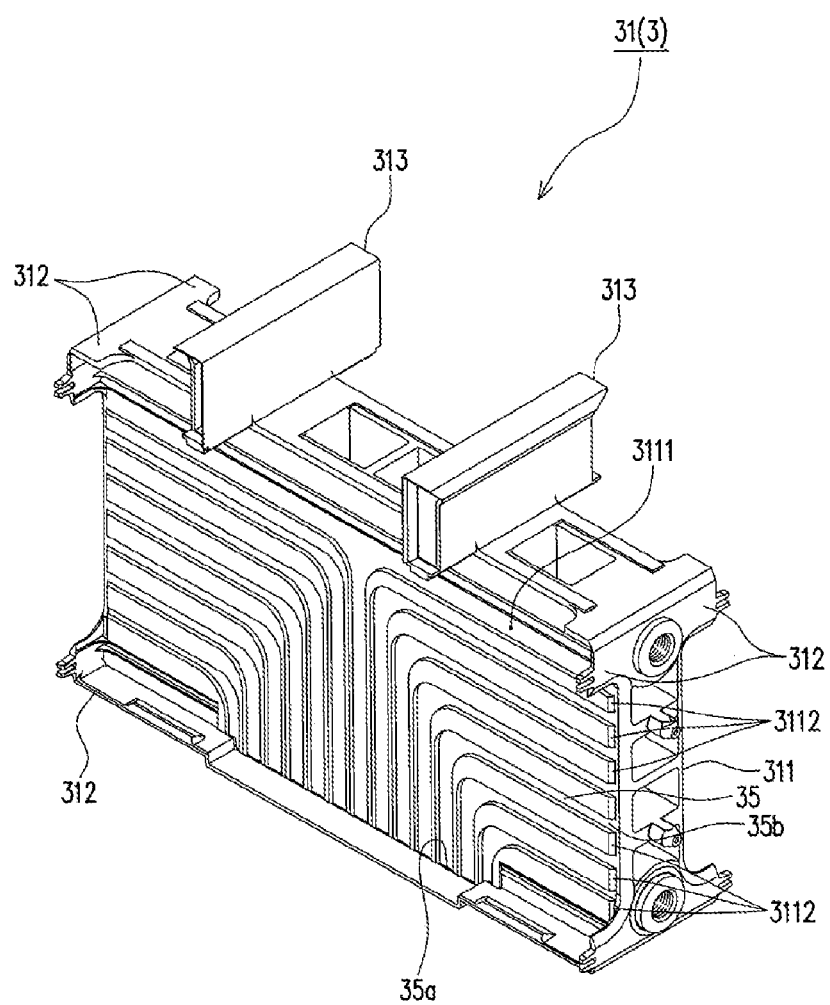
FIG. 5 is a perspective view of a first adjacent member.
Figure 6:
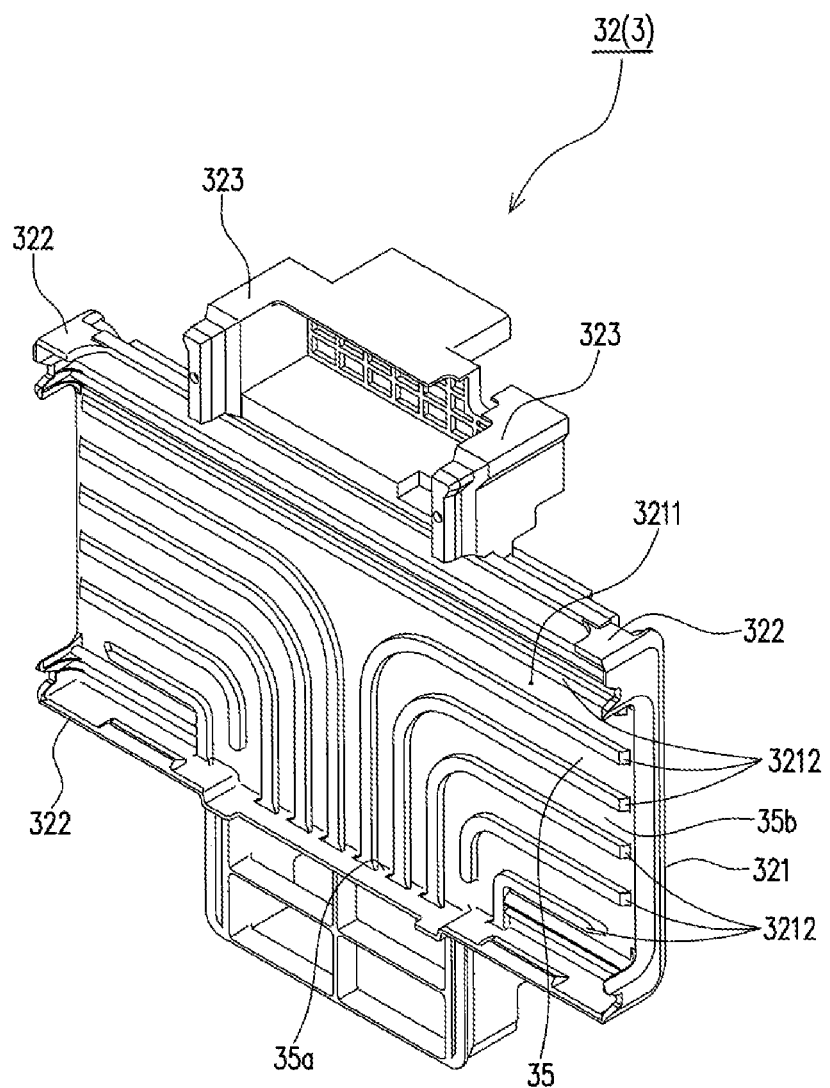
FIG. 6 is a perspective view of a second adjacent member.
Figure 6:
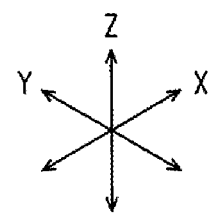
Figure 7:
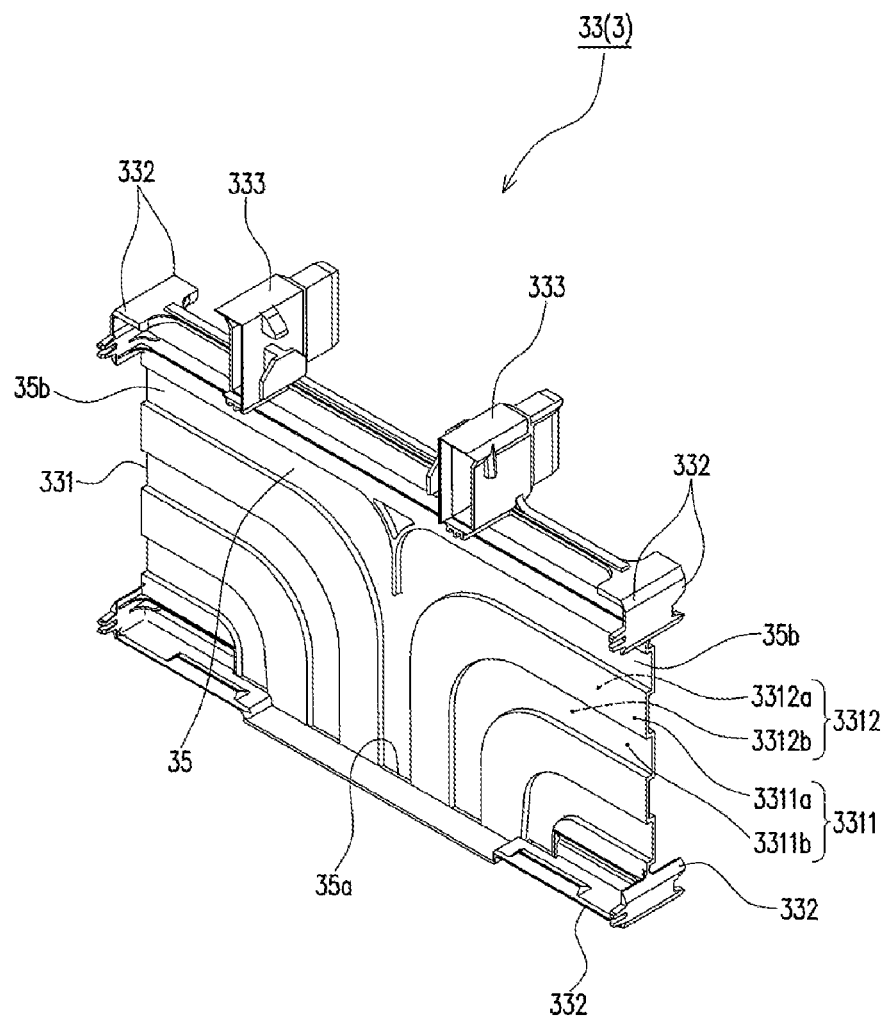
FIG. 7 is a perspective view of a third adjacent member.
Figure 7:
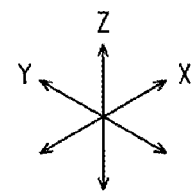
Figure 8:
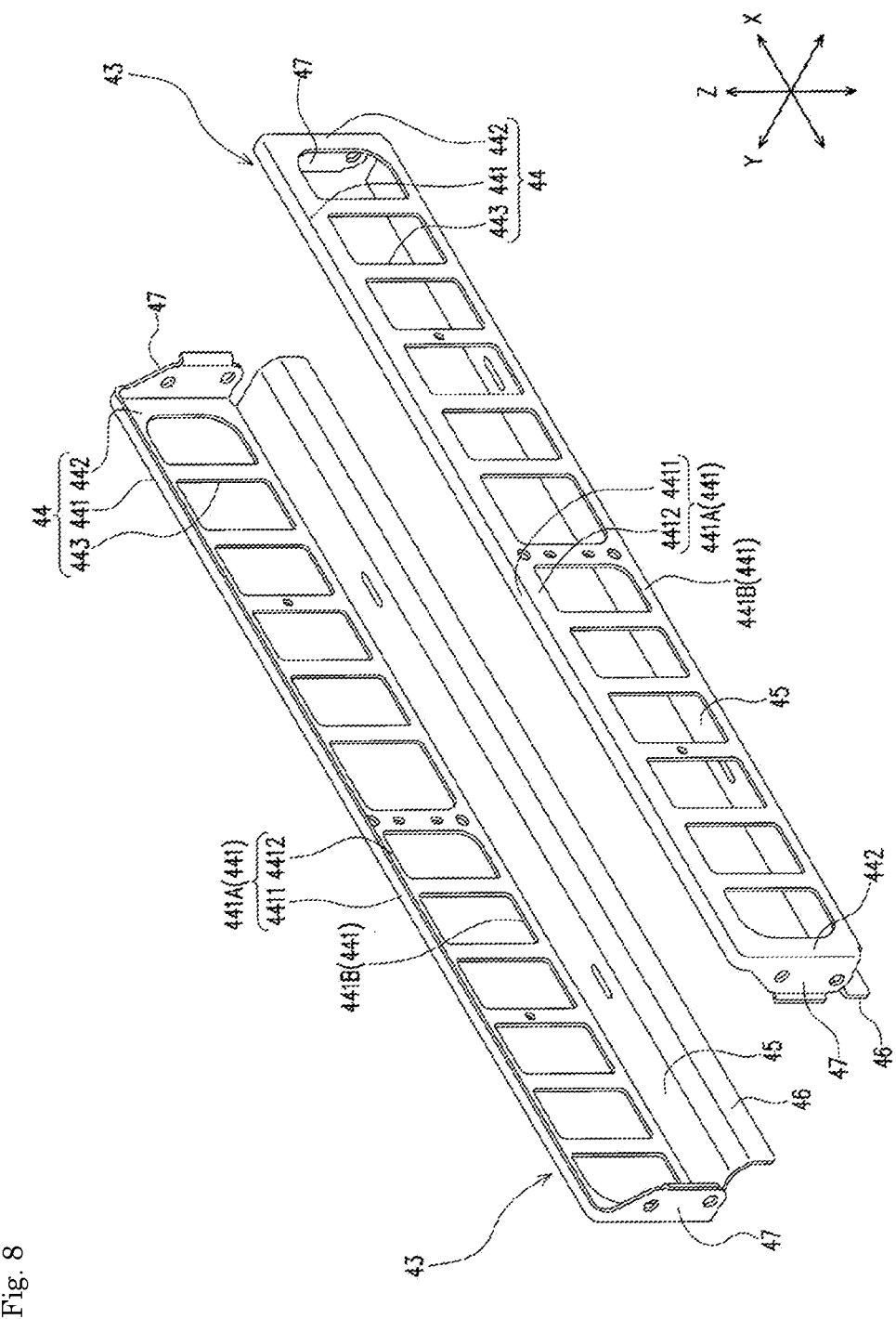
FIG. 8 is a perspective view of a pair of connecting members.
Figure 9:
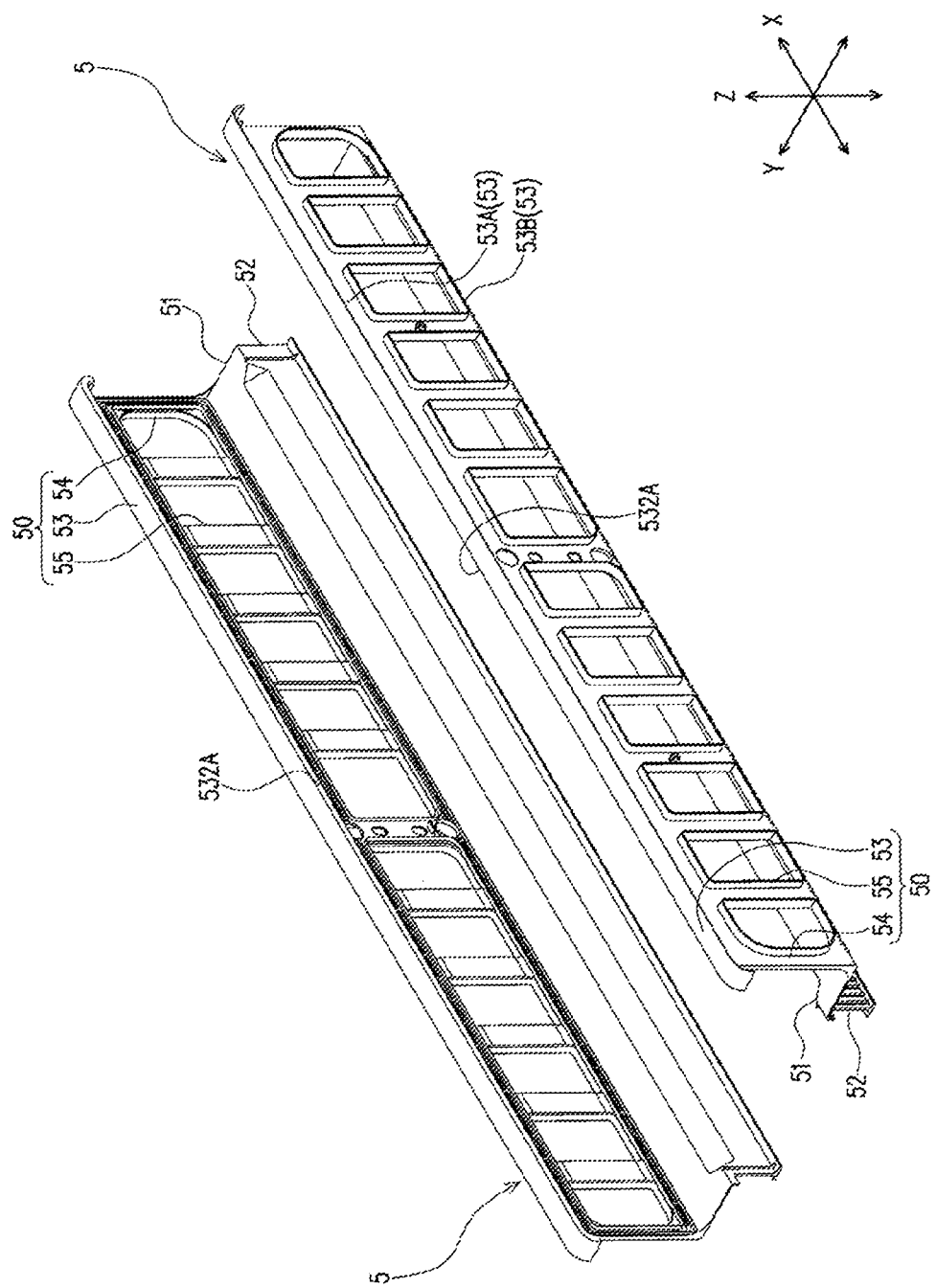
FIG. 9 is a perspective view of a pair of insulators.

As shown in FIG. 5, the first adjacent member 31 has a plate-shaped first main body portion 311 located between two energy storage devices 2 adjacent to each other in the X-axis direction, and a first regulating part 312 that regulates a relative movement of the energy storage device 2 adjacent to the first main body portion 311 with respect to the first main body portion 311. The first adjacent member 31 also has a first extension portion 313 and the like extending from the peripheral edge of the first main body portion 311.

The first main body portion 311 is a portion that overlaps the long wall portion 214 of the case 21 of the energy storage device 2 when viewed from the X-axis direction, and extends in the Y-Z plane (the plane including the Y-axis and the Z-axis) direction. The first main body portion 311 has a plurality of first protrusions 3112 protruding from a surface 3111 facing the energy storage device 2. The first protrusions 3112 abut on the energy storage device 2 (outer surface of the long wall portion 214) adjacent to the first main body portion 311 to form a gap between the energy storage device 2 (outer surface of the long wall portion 214) and the surface 3111, and this gap constitutes the flow channel 35. In the first main body portion 311 of the present embodiment, the first protrusion 3112 protrudes from each of the surface 3111 facing one side and the surface 3111 facing the other side in the X-axis direction. In the first adjacent member 31 of FIG. 5, the flow channel 35 and the openings 35a and 35b at the ends of the flow channel 35 are shown, but these configurations are formed in a state where the energy storage device 2 is adjacent to the first adjacent member 31.

The dimension of the first main body portion 311 in the X-axis direction is larger than the dimension of a portion corresponding to the first main body portion 311 in the second adjacent member 32 in the X-axis direction, and the dimension of a portion corresponding to the first main body portion 311 in the third adjacent member 33 in the X-axis direction. Further, both ends of the first main body portion 311 in the Y-axis direction are fixed to the holding member 4. The first main body portion 311 of the present embodiment is fixed to the holding member 4 by bolts 315.

The first regulating part 312 extends from the first main body portion 311 in the X-axis direction, abuts on the energy storage device 2 (specifically, the case 21) adjacent to the first main body portion 311 from the outside in the Y-Z plane direction, and thereby regulates the relative movement of the energy storage device 2 in the Y-Z plane direction with respect to the first main body portion 311. The first regulating part 312 of the present embodiment extends from the first main body portion 311 toward both sides in the X-axis direction.

The first extension portion 313 extends from one end (upper side in FIG. 4) of the first main body portion 311 in the Z-axis direction to one side in the Z-axis direction and extends to both sides in the X-axis direction. That is, the first extension portion 313 is a plate-shaped portion extending along the X-Z plane (the plane including the X-axis and the Z-axis). The first extension portion 313 of the present embodiment has a rectangular shape when viewed from the Y-axis direction, and is arranged in a pair on the first main body portion 311. The pair of first extension portions 313 is arranged at intervals in the Y-axis direction so that the gas release valve 217 of the energy storage device 2 is located between them (see FIG. 3).

As shown in FIGS. 1 to 4 and 6, the second adjacent member 32 has a plate-shaped second main body portion 321 located between the energy storage device 2 and the holding member 4, and a second regulating part 322 that regulates the relative movement of the energy storage device 2 adjacent to the second main body portion 321 with respect to the second main body portion 321. The second adjacent member 32 also has a second extension portion 323 and the like extending from the peripheral edge of the second main body portion 321.

The second main body portion 321 is a portion that overlaps the long wall portion 214 of the case 21 of the energy storage device 2 when viewed from the X-axis direction, and extends in the Y-Z plane direction. The second main body portion 321 has a plurality of second protrusions 3212 protruding from the surface 3211 facing the energy storage device 2. The second protrusions 3212 abut on the energy storage device 2 (outer surface of the long wall portion 214) adjacent to the second main body portion 321 to form a gap between the energy storage device 2 (outer surface of the long wall portion 214) and the surface 3211, and this gap constitutes the flow channel 35. In the second main body portion 321 of the present embodiment, the second protrusions 3212 protrude from the surface 3211 facing the energy storage device 2. In the second adjacent member 32 of FIG. 6, the flow channel 35 and the openings 35a and 35b at the ends of the flow channel 35 are shown, but these configurations are formed in a state where the energy storage device 2 is adjacent to the second adjacent member 32.

The second regulating part 322 extends from the second main body portion 321 in the X-axis direction, abuts on the energy storage device 2 (specifically, the case 21) adjacent to the second main body portion 321 from the outside in the Y-Z plane direction, and thereby regulates the relative movement of the energy storage device 2 in the Y-Z plane direction with respect to the second main body portion 321. The second regulating part 322 of the present embodiment extends from the second main body portion 321 toward the energy storage device 2 side in the X-axis direction.

The second extension portion 323 extends from one end of the second main body portion 321 in the Z-axis direction to one side in the Z-axis direction and extends to both sides in the X-axis direction. That is, the second extension portion 323 is a plate-shaped portion extending along the X-Z plane. The second extension portion 323 of the present embodiment is arranged in a pair on the second main body portion 321. The pair of second extension portions 323 is arranged at the same positions as the pair of first extension portions 313 of the first adjacent member 31 in the Y-axis direction. That is, the pair of second extension portions 323 is arranged at intervals in the Y-axis direction so that the gas release valve 217 of the energy storage device 2 is located between them (see FIG. 3).

As shown in FIGS. 1 to 4 and 7, each of the plurality of third adjacent members 33 has a plate-shaped third main body portion (main body portion) 331 located between two energy storage devices 2 adjacent to each other in the X-axis direction, and a third regulating part 332 that regulates the relative movement of the energy storage device 2 adjacent to the third main body portion 331 with respect to the third main body portion 331. Further, the third adjacent member 33 also has a third extension portion (extension portion) 333 and the like extending from the peripheral edge of the third main body portion 331.

The third main body portion 331 is a portion that overlaps the long wall portion 214 of the case 21 of the energy storage device 2 when viewed from the X-axis direction, and extends in the Y-Z plane direction. The third main body portion 331 has a first surface 3311 which is a surface on one side (left side in FIG. 7) in the X-axis direction and a second surface 3312 which is a surface on the other side (right side in FIG. 4) in the X-axis direction.

Each of the first surface 3311 and the second surface 3312 includes contact portions 3311a and 3312b that abut on an energy storage device 2 (outer surface of the long wall portion 214) adjacent to the third main body portion 331, and separation portions 3311b and 3312a that are separated from the energy storage device 2 (outer surface of the long wall portion 214) in the X-axis direction. The contact portion 3311a and the separation portion 3311b included in the first surface 3311 and the contact portion 3312b and the separation portion 3312a included in the second surface 3312 are arranged at corresponding positions. Specifically, the contact portion 3311a of the first surface 3311 overlaps with the separation portion 3312a of the second surface 3312 when viewed from the X-axis direction, and the separation portion 3311b of the first surface 3311 overlaps with the contact portion 3312b of the second surface 3312 when viewed from the X-axis direction.

In this way, an uneven shape is formed on each of the first surface 3311 and the second surface 3312, and the uneven shape forms a flow channel 35 between the third main body portion 331 and the energy storage device 2 adjacent to the third main body portion 331. Specifically, on the first surface 3311 side in the X-axis direction, the contact portion 3311a abuts on the energy storage device 2 (outer surface of the long wall portion 214) adjacent to the third main body portion 331 to form a gap between the energy storage device 2 (outer surface of the long wall portion 214) and the separation portion 3311b, and this gap constitutes the flow channel 35. Similarly, on the second surface 3312 side in the X-axis direction, the contact portion 3312b abuts on the energy storage device 2 adjacent to the third main body portion 331 to form a gap between the energy storage device 2 (outer surface of the long wall portion 214) and the separation portion 3312a, and this gap constitutes the flow channel 35. In the third adjacent member 33 of FIG. 7, the flow channel 35 and the openings 35a and 35b at the ends of the flow channel 35 are shown, but these configurations are formed in a state where the energy storage device 2 is adjacent to the third adjacent member 33.

The third regulating part 332 extends from the third main body portion 331 in the X-axis direction, and abuts on an energy storage device 2 (specifically, the case 21) adjacent to the third main body portion 331 from the outside in the Y-Z plane direction, and thereby regulates the relative movement of the energy storage device 2 in the Y-Z plane direction with respect to the third main body portion 331. The third regulating part 332 of the present embodiment extends from the third main body portion 331 toward both sides in the X-axis direction.

The third extension portion 333 extends from one end of the third main body portion 331 in the Z-axis direction to one side in the Z-axis direction and extends to both sides in the X-axis direction. That is, the third extension portion 333 is a plate-shaped portion extending along the X-Z plane. The third extension portion 333 of the present embodiment has a rectangular shape and is arranged in a pair on the third main body portion 331. The pair of third extension portions 333 are arranged at the same positions as the pair of first extension portions 313 of the first adjacent member 31 and the second extension portion 323 of the second adjacent member 32 in the Y-axis direction. That is, the pair of third extension portions 333 is arranged at intervals in the Y-axis direction so that the gas release valve 217 of the energy storage device 2 is located between them (see FIG. 3).

The extension portions 313, 323, and 333 of the respective adjacent members 31, 32, and 33 described above are connected in the X-axis direction to constitute a wall 36 extending in the X-axis direction along the respective lid plates 216 of the plurality of energy storage devices 2. The energy storage apparatus 1 of the present embodiment has a pair of walls 36 each extending in the X-axis direction at intervals in the Y-axis direction (see FIG. 3).

Figure 4:
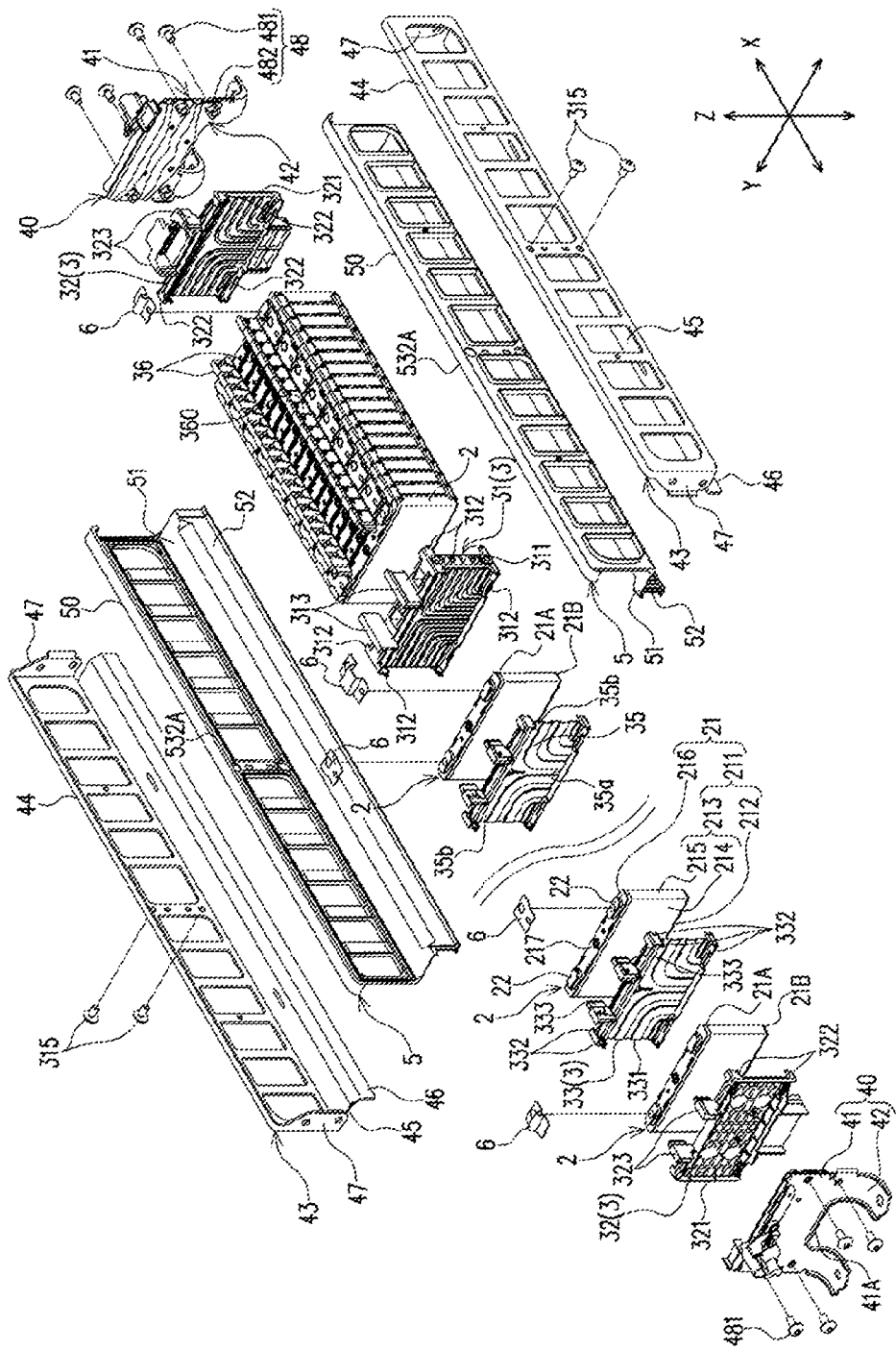
FIG. 4 is an exploded perspective view of the energy storage apparatus in a state where a part of the configuration is omitted.

Specifically, as shown in FIGS. 3 and 4, on each of one side and the other side in the X-axis direction with reference to a first adjacent member 31, in the first extension portion 313 of the first adjacent member 31 and the third extension portion 333 of the third adjacent member 33 adjacent to the first adjacent member 31 via the energy storage device 2, the end of the third extension portion 333 is inserted into the end of the first extension portion 313. Further, in the second extension portion 323 of a second adjacent member 32 and the third extension portion 333 of the third adjacent member 33 adjacent to the second adjacent member 32 via the energy storage device 2, the end of the second extension portion 323 is inserted into the end of the third extension portion 333. Further, in the third extension portions 333 of the third adjacent members 33 adjacent to each other via the energy storage device 2, the end of the third extension portion 333 on the second adjacent member 32 side on the first adjacent member 31 side is inserted into the end of the third extension portion 333 on the first adjacent member 31 side on the second adjacent member 32 side.

The respective extension portions 313, 323, and 333 are connected (connected) in the X-axis direction as described above to form a pair of walls 36 extending in the X-axis direction at each position sandwiching the gas release valve 217 of the lid plate 216 of each energy storage device 2 in the Y-axis direction. That is, in the energy storage apparatus 1 of the present embodiment, the pair of walls 36 extends in the X-axis direction so as to be parallel to each other at intervals in the Y-axis direction. The pair of walls 36 constitutes a part of a guide path (exhaust path) for a gas when the gas is ejected from the gas release valve 217 due to an increase in the internal pressure of the energy storage device 2 (case 21).

In the energy storage apparatus 1 of the present embodiment, the surface (outer side surface) 360 of each of the pair of walls 36 facing outward in the Y-axis direction is one of a pair of facing surfaces facing each other and located on both sides of at least a part of the above-mentioned bus bar holding member 7. Details of the outer side surface 360 of the wall 36 will be described later.

As shown in FIGS. 1 to 4 and 8, the holding member 4 surrounds the plurality of energy storage devices 2 and the plurality of adjacent members 3 so as to hold the plurality of energy storage devices 2 and the plurality of adjacent members 3 together. The holding member 4 is made of a conductive member such as metal. Specifically, the holding member 4 includes a pair of termination members 40 arranged on both sides of the plurality of energy storage devices 2 in the X-axis direction, and connection members 43 connecting the end portions of the termination member 40 in the Y-axis direction. Further, the holding member 4 has a fixing member 48 that fixes (connects) the terminal member 40 and the connecting member 43. The fixing member 48 of the present embodiment includes a bolt 481 and a nut 482. In the energy storage apparatus 1 of the present embodiment, the pair of connection members 43 connect both end portions of the pair of termination members 40 in the Y-axis direction.

Each of the pair of termination members 40 is arranged so as to sandwich the adjacent member 3 with the energy storage device 2 arranged at the end in the X-axis direction. Each of these pair of termination members 40 includes a termination member main body 41 which is a part extending along the Y-Z plane and overlapping with the energy storage device 2 when viewed from the X-axis direction, and an extension portion 42 extending from the termination member main body 41.

The termination member main body 41 is a rectangular portion corresponding to the energy storage device 2. The extension portion 42 is a portion extending from a side 41A corresponding to the closing portion 212 of the energy storage device 2 in the rectangular terminal member main body 41. The extension portion 42 is used to fix the energy storage apparatus 1 to the installation surface. The termination member 40 of the present embodiment has two extension portions 42 that are arranged at intervals in the Y-axis direction.

The pair of connecting members 43 is arranged on both sides of the plurality of energy storage devices 2 in the Y-axis direction. Each of the pair of connecting members 43 has a connecting member main body 44 extending in the X-axis direction along the short wall portion 215 of each of the plurality of energy storage devices 2, a first extension portion 45 extending from an end of the connecting member main body 44 on the other side in the Z-axis direction in the Y-axis direction and extending along the closing portion 212 of each of the plurality of energy storage devices 2, and a second extension portion 46 extending from the first extension portion 45 to the other side in the Z-axis direction. Further, each of the pair of connecting members 43 has a connected portion 47 extending in the Y-axis direction from each end of the connecting member main body 44 in the X-axis direction along a surface of the terminal member 40 facing outward in the X-axis direction.

The connecting member main body 44 has a pair of beam portions 441 each extending in the X-axis direction at intervals in the Z-axis direction, a pair of end connecting portions 442 each extending in the Z-axis direction and connecting the corresponding (facing in the Z-axis direction) ends of the pair of beam portions 441, and a plurality of intermediate connecting portions 443 each extending in the Z-axis direction and connecting the portions of the pair of beam portions 441 facing each other in the Z-axis direction at an intermediate position in the X-axis direction. The plurality of intermediate connecting portions 443 are arranged at intervals in the X-axis direction.

The pair of beam portions 441 each include a first beam portion 441A extending along a first corner portion 21A (see FIG. 4) of the case 21 composed of the lid plate 216 and the short wall portion 215 of the energy storage device 2, and a second beam portion 441B extending along a second corner portion 21B (see FIG. 4) of the case 21 composed of the closing portion 212 and the short wall portion 215 of the energy storage device 2.

The first beam portion 441A has a first portion 4411 extending in the X-axis direction along the lid plate 216 in the first corner portion 21A of the case 21 of each energy storage device 2, and a second portion 4412 extending in the X-axis direction along the short wall portion 215 in the first corner portion 21A of the case 21 of each energy storage device 2. The cross-sectional shape of the first beam portion 441A along the Y-Z plane is L-shaped.

As shown in FIGS. 1 to 4 and 9, the insulator 5 has an insulating property and is arranged between the connecting member 43 and the plurality of energy storage devices 2. The insulator 5 covers a region of the connecting member 43 facing at least a plurality of energy storage devices 2. Specifically, the insulator 5 has a main body covering portion 50 that covers a surface of a connecting member main body 431 facing each energy storage device 2, a first covering portion 51 that covers a surface of a first extension portion 432 facing each energy storage device 2, and a second covering portion 52 that covers a surface of a second extension portion 433 facing inward in the Y-axis direction.

The main body covering portion 50 has a pair of beam portion covering portions 53 for insulating between the pair of beam portions 441 and the energy storage device 2, a pair of end covering portions 54 for insulating between the pair of end connecting portions 442 and the energy storage device 2, and a plurality of intermediate covering portions 55 for insulating between the plurality of intermediate connecting portions 443 and the energy storage device 2. The covering portions 53, 54, 55 have shapes corresponding to the respective portions 44, 45, 46 of the connecting member 43.

Figure 10:
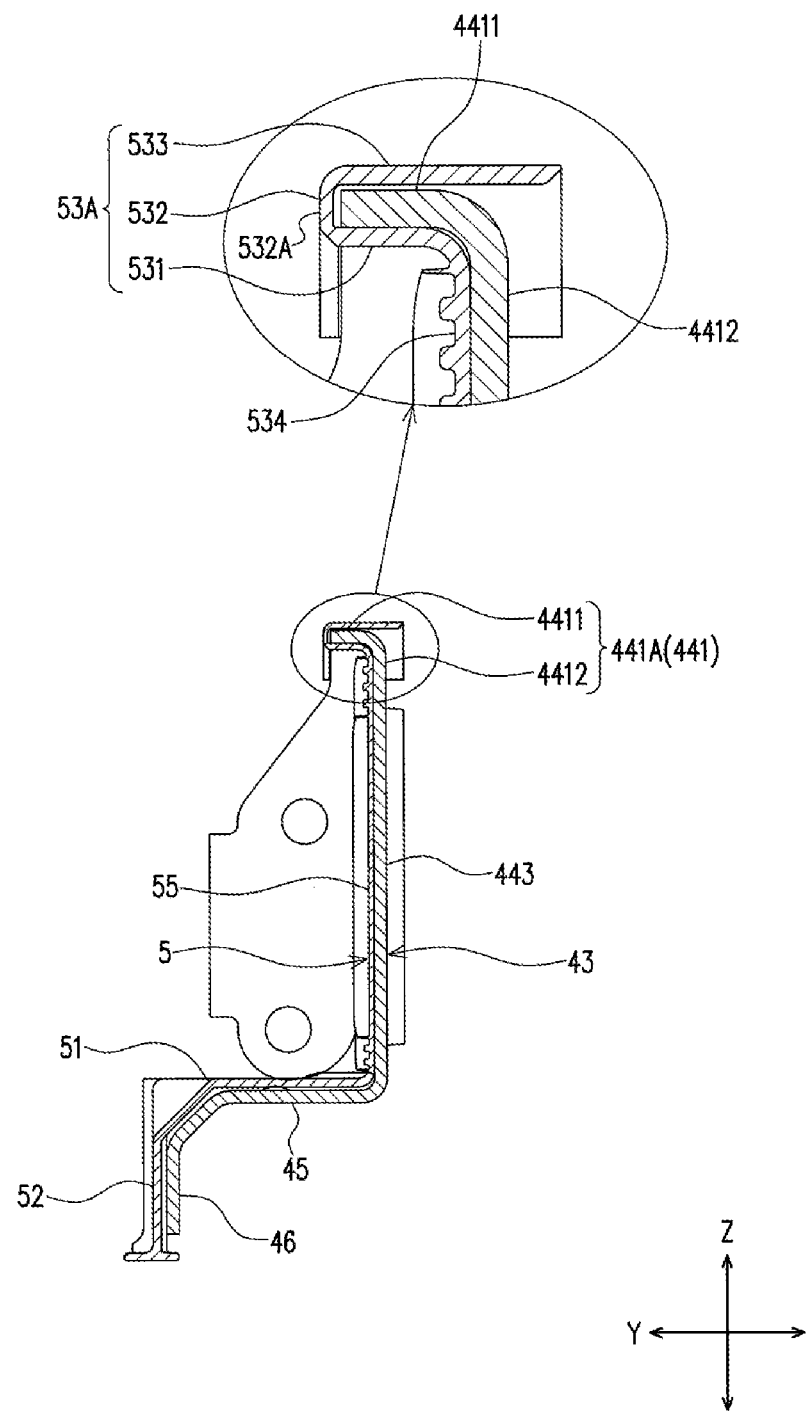
FIG. 10 is a cross-sectional view in a state where the connecting member and the insulator are overlapped.

As shown also in FIG. 10, a lid plate side covering portion 53A, which is the beam portion covering portion covering the first beam portion 441A of the pair of beam portion covering portions 53, has, at an inside (energy storage device 2 side) of the first beam portion 441A, a first inner portion 531 that covers a surface of the first portion 4411 facing the lid plate 216 side by extending inward in the Y-axis direction and extending in the X-axis direction from a boundary position between the first portion 4411 and the second portion 4412, a tip portion 532 that covers a tip surface of the first portion 4411 in the Y-axis direction by extending to one side in the Z-axis direction and extending in the X-axis direction from the tip of the first inner portion 531 in the Y-axis direction, and an outer portion 533 that covers a surface of the first portion 4411 facing an outside (side opposite to the lid plate 216 side) by extending outward in the Y-axis direction and extending in the X-axis direction from one end of the tip portion 532 in the Z-axis direction. Further, the lid plate side covering portion 53A also has a second inner portion 534 that covers a surface of the second portion 4412 facing the short wall portion 215 side by extending to the other side in the Z-axis direction and extending in the X-axis direction from an outer end (boundary position between the first portion 4411 and the second portion 4412) of the first inner portion 531 in the Y-axis direction.

The closing portion side covering portion 53B, which is a beam portion covering portion covering the second beam portion 442B of the pair of beam portion covering portions 53, extends in the X-axis direction and covers a surface of the second beam portion 442B on the energy storage device 2 side.

Each of the pair of end covering portions 54 extends in the Z-axis direction and covers a surface of the end connecting portion 442 facing the energy storage device 2 side.

Each of the plurality of intermediate covering portions 55 extends in the Z-axis direction and covers a surface of the intermediate connecting portion 443 facing the energy storage device 2 side.

In the energy storage apparatus 1 of the present embodiment, the surface (inner side surface) 532A of the tip portion 532 of the lid plate side covering portion 53A of the insulator 5 configured as described above, the surface 532A facing inward in the Y-axis direction, is the other surface of a pair of facing surfaces that are located on both sides of at least a part of the above-mentioned bus bar holding member 7 and face each other.

Figure 11:
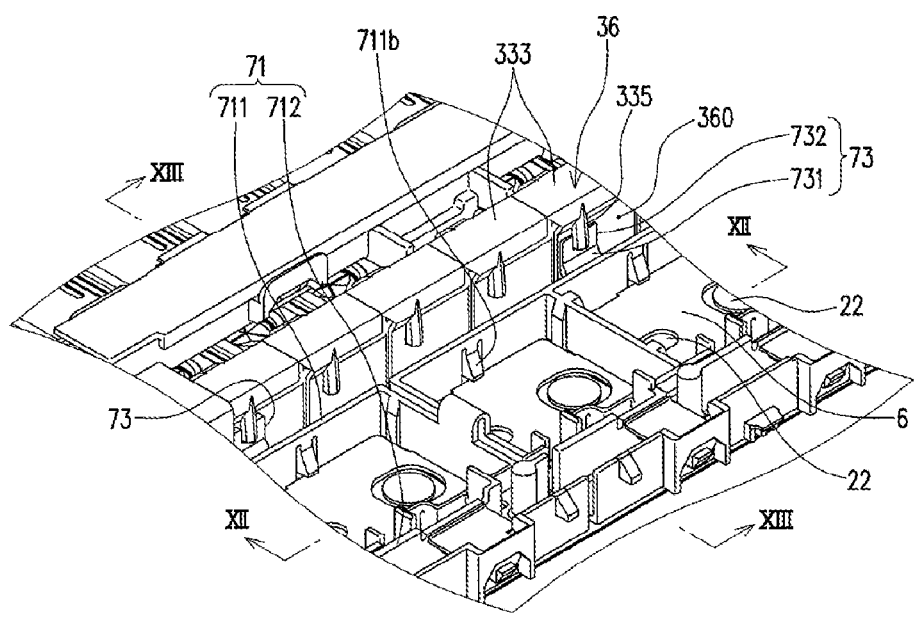
FIG. 11 is an enlarged view of the vicinity of the bus bar holding member in FIG. 2.
Figure 11:
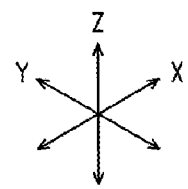
Figure 12:
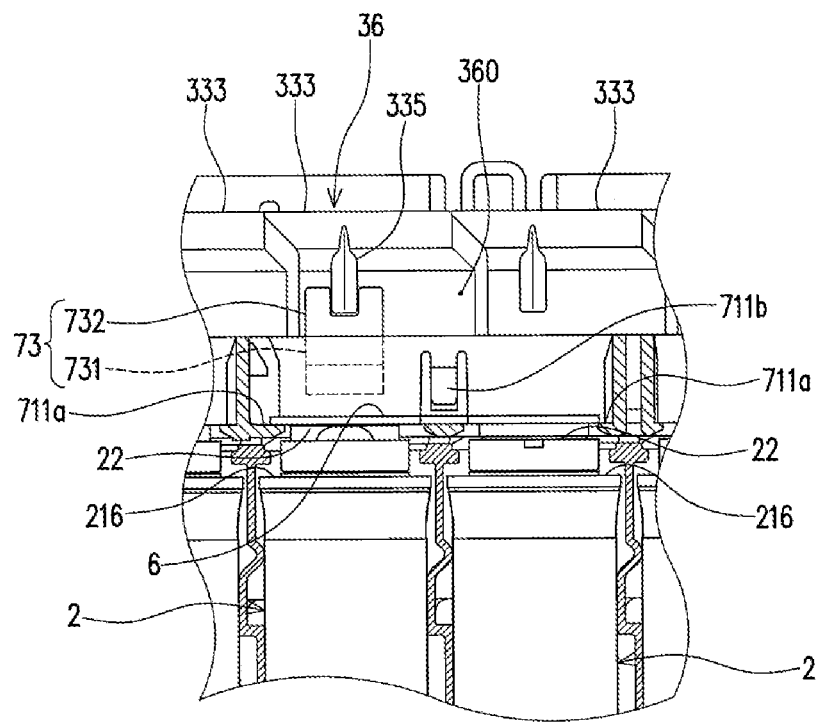
FIG. 12 is a cross-sectional view of a XII-XII position in FIG. 11.
Figure 12:
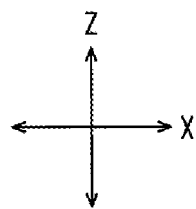

Here, the pair of facing surfaces that is located on both sides of at least a part of the above-mentioned bus bar holding member 7 and face each other will be described in detail also with reference to FIGS. 11 to 13.

In the energy storage apparatus 1 of the present embodiment, the pair of facing surfaces is the outer side surface 360 of the wall 36 and the surface (inner side surface) 532A of the tip portion 532 of the insulator 5, the surface 532A facing inward in the Y-axis direction. As shown in FIG. 3, the outer side surface 360 and the inner side surface 532A extend in the X-axis direction along the lid plate 216 of each energy storage device 2 at positions sandwiching the bus bar 6 in the Y-axis direction (that is, positions on both sides in the Y-axis direction). In the energy storage apparatus 1 of the present embodiment, the outer side surface 360 and the inner side surface 532A extend in the X-axis direction at each of positions sandwiching the respective bus bars 6 arranged in the X-axis direction at one ends in the Y-axis direction and positions sandwiching the respective bus bars 6 arranged in the X-axis direction at the other ends in the Y-axis direction. That is, the energy storage apparatus 1 of the present embodiment includes two pairs of a pair of facing surfaces composed of the outer side surface 360 and the inner side surface 532A (specifically, a pair of facing surfaces located on both sides of at least a part of the bus bar holding member 7 and facing each other.

The inner side surface 532A is formed by a surface facing inward in the Y-axis direction in a single member (lid plate side covering portion 53A of the insulator 5). The dimension of this inner side surface 532A in the Z-axis direction is smaller than the dimension of the outer side surface 360 in the Z-axis direction (see FIG. 13). The inner side surface 532A faces the other end of the outer side surface 360 in the Z-axis direction.

The outer side surface 360 is formed by connecting the surfaces (end surfaces) facing outward in the Y-axis direction of the respective extension portions 313, 323, and 333 in the X-axis direction. The outer side surface 360 has a convex part 335 that projects toward the inner side surface 532A in the Y-axis direction.

The convex part 335 is a portion that engages with the bus bar holding member 7, and is arranged on a surface (outer surface) of the third extension portion 333 of the third adjacent member 33, the surface facing outward in the Y-axis direction. That is, the third adjacent member 33 has the convex part 335. The convex part 335 extends from one end toward the other side of the outer side surface 360 along the Z-axis direction. Specifically, the convex part 335 extends from one end of the outer side surface 360 to a position in front of the one end edge position of the inner side surface 532A in the Z-axis direction (see FIG. 12). That is, the convex part 335 does not overlap with the inner side surface 532A when viewed from the Y-axis direction. Further, the outer edge of the convex part 335 in the Y-axis direction is slightly inclined with respect to the Z-axis so as to be displaced to the outside in the Y-axis direction (inner side surface 532A side) toward the other side in the Z-axis direction. (See FIG. 13).

The outer side surface 360 of the present embodiment has a plurality of convex parts 335. The plurality of convex parts 335 are arranged at intervals in the X-axis direction. In the energy storage apparatus 1 of the present embodiment, the convex part 335 is formed on each of the plurality of third extension portions 333 (specifically, the surface of each third extension portion 333 facing outward in the Y-axis direction).

As shown in FIGS. 1, 2, and 11 to 13, the bus bar holding member 7 is attached at positions along the plurality of energy storage devices 2 while holding the plurality of bus bars 6. The bus bar holding member 7 is a member that extends along the X-Y plane, and has a holding portion 71 that holds the bus bar 6 and opens on both sides in the Z-axis direction, and a lid portion 72 that closes an opening on one side of the holding portion 71 in the Z-axis direction. Further, the bus bar holding member 7 has an elastic deformation portion 73 that is in contact with one of the above-mentioned pair of facing surfaces (in the example of the present embodiment, the outer side surface 360 and the inner side surface 532A) in a state of being elastically deformed. The bus bar holding member 7 of the present embodiment is made of resin.

The holding portion 71 has a tubular portion and holds the bus bar 6 in a state of surrounding the bus bar 6. Specifically, the holding portion 71 is a rectangular portion when viewed from the Z-axis direction, and has a square tubular portion 711 surrounding the peripheral edge of the bus bar 6 and another portion 712 extending outward from the square tubular portion 711 in the Y-axis direction.

Figure 13:
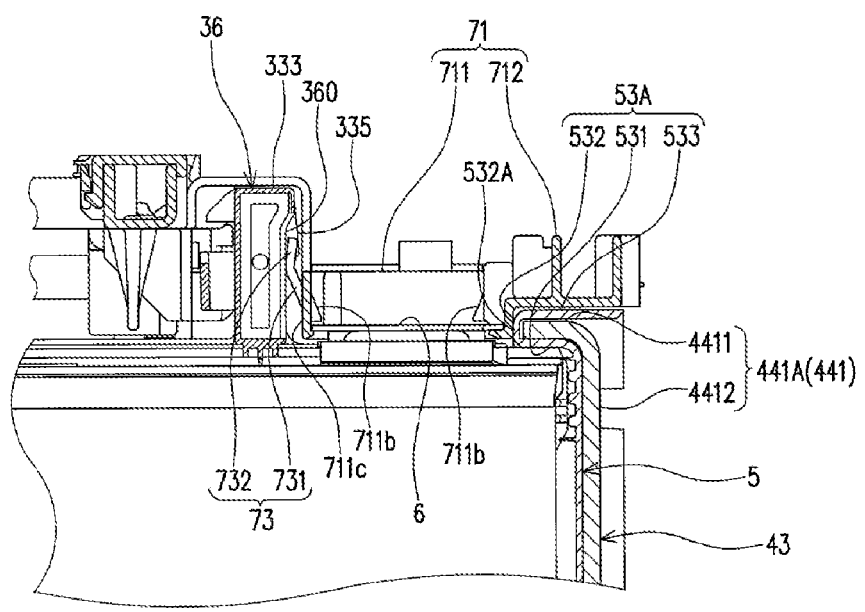
FIG. 13 is a cross-sectional view of a XIII-XIII position in FIG. 11.
Figure 13:
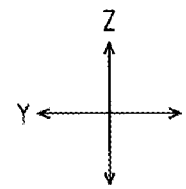
Figure 14:
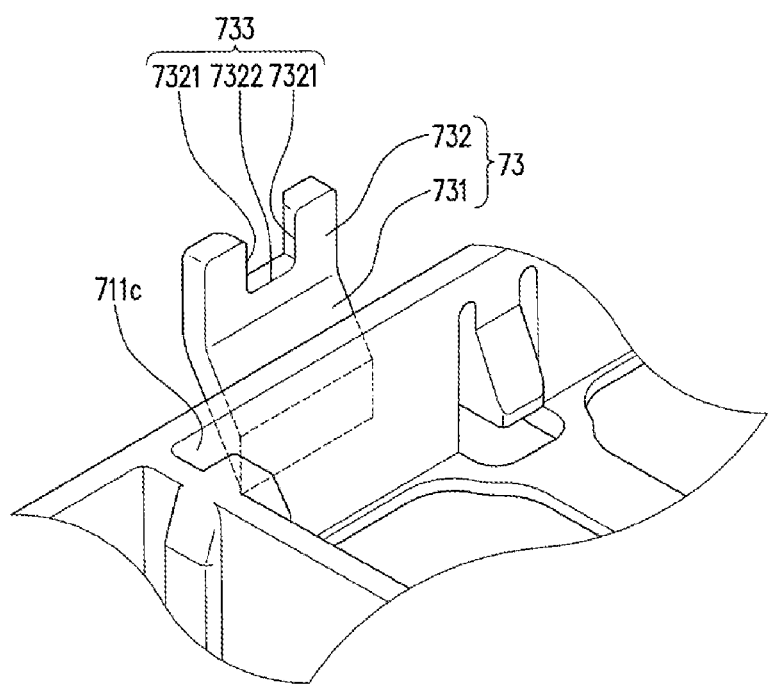
FIG. 14 is an enlarged perspective view of an elastic deformation portion and its periphery.
Figure 14:
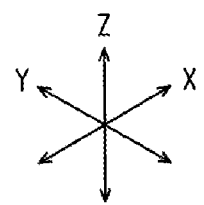
Figure 15:
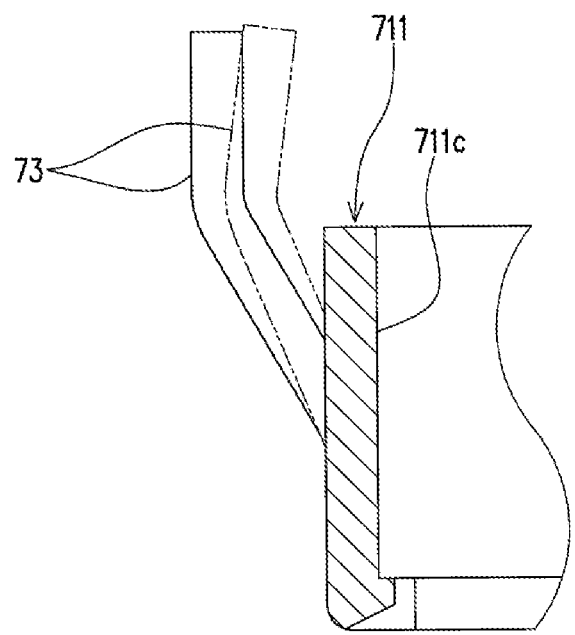
FIG. 15 is a diagram for explaining the elastic deformation of the elastic deformation portion.
Figure 15:
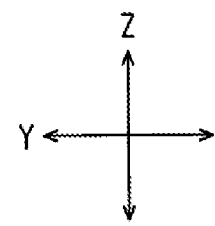
Figure 16A:
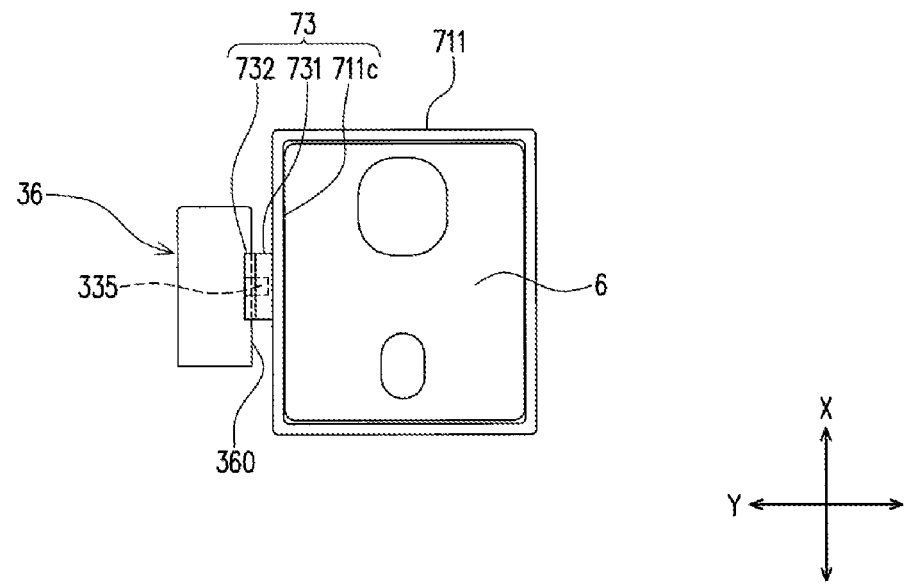
FIG. 16A is a Z-axis directional view for explaining an elastic deformation portion according to another embodiment.
Figure 16B:
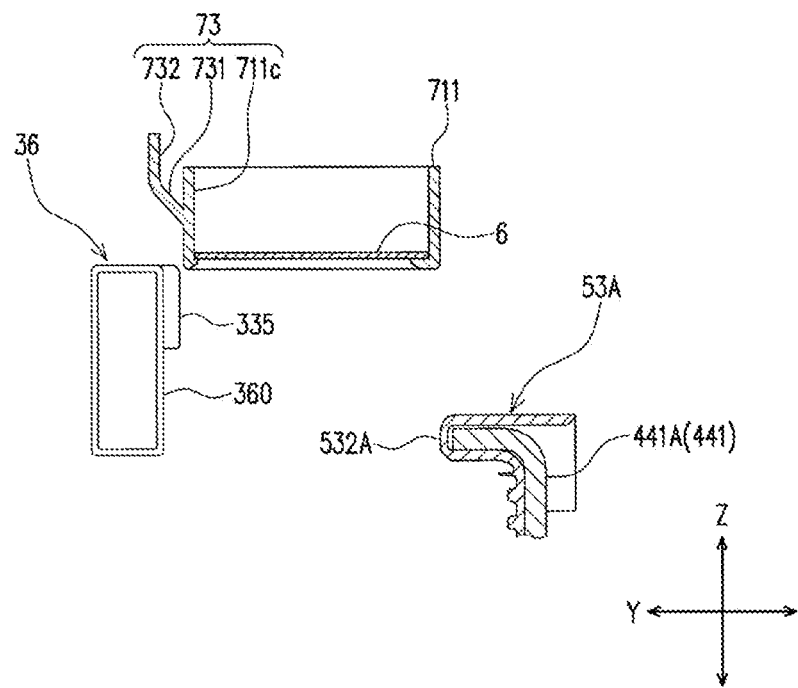
FIG. 16B is a cross-sectional view for explaining an elastic deformation portion according to another embodiment.
Figure 17A:
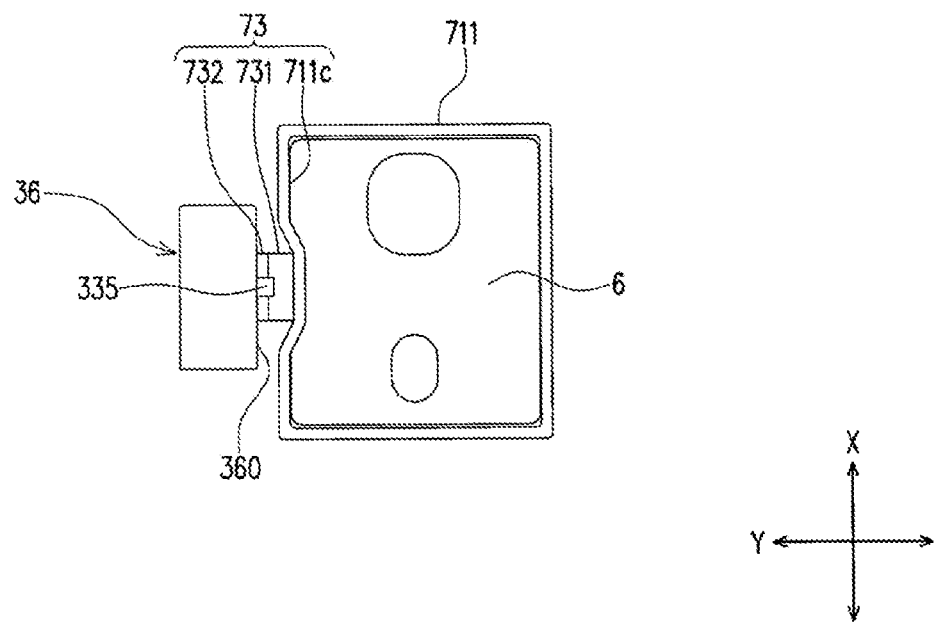
FIG. 17A is a Z-axis directional view for explaining an elastic deformation portion according to another embodiment.
Figure 17B:
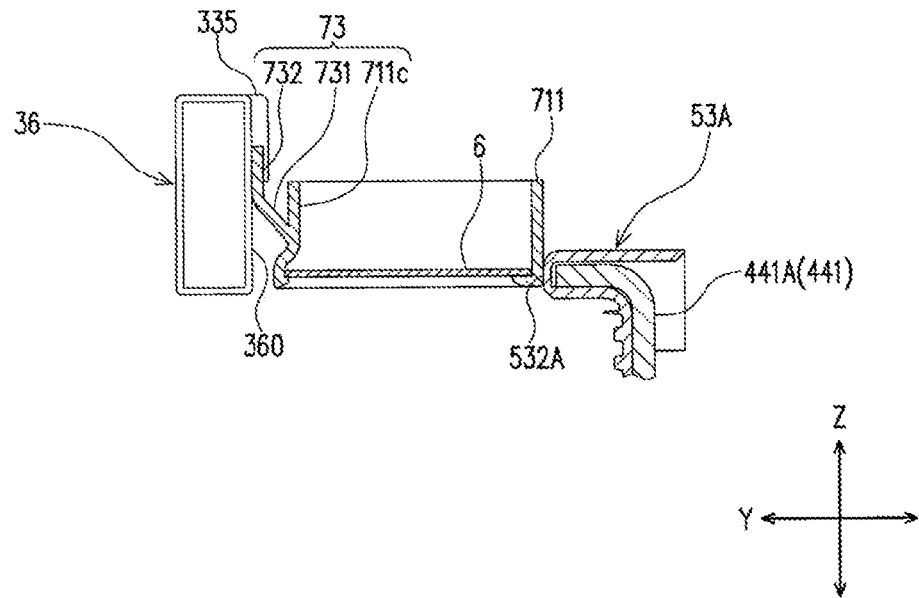
FIG. 17B is a cross-sectional view for explaining an elastic deformation portion according to another embodiment.

The another portion 712 extends outward in the Y-axis direction from a position deviated by a predetermined distance from the other side end edge to one side of the square tubular portion 711 in the Z-axis direction (see FIG. 13).

Further, the square tubular portion 711 has a support part 711a extending inward from an opening peripheral edge portion on the other side in the Z-axis direction (the end on the other side) and extending in the circumferential direction of the opening on the other side, and a claw part 711b projecting inward from the inner peripheral surface at a predetermined distance (distance corresponding to the thickness of the bus bar 6) from the support part 711a in the Z-axis direction. Then, the square tubular portion 711 holds the bus bar 6 by arranging the peripheral edge portion of the bus bar 6 between the support part 711a and the claw part 711b in the Z-axis direction.

The square tubular portion 711 is arranged between the outer side surface 360 and the inner side surface 532A in a state where the outer wall in the Y-axis direction is in contact with the inner side surface 532A. That is, in the energy storage apparatus 1 of the present embodiment, the square tubular portion 711 is a part of the bus bar holding member 7 located between the above-mentioned pair of facing surfaces (in the example of the present embodiment, the outer side surface 360 and the inner side surface 532A). The dimension of the square tubular portion 711 in the Y-axis direction is smaller than the distance between the outer side surface 360 and the inner side surface 532A in the Y-axis direction (see FIG. 13).

In the energy storage apparatus 1 of the present embodiment, since a plurality of bus bars 6 are arranged, the bus bar holding member 7 has a plurality of (a number corresponding to the number of bus bars 6) holding portions 71. Specifically, the plurality of holding portions 71 are arranged in the X-axis direction at one end of the energy storage apparatus 1 in the Y-axis direction, thereby individually holding each of the plurality of bus bars 6 arranged in the X-axis direction at the end. Further, the plurality of holding portions 71 are arranged in the X-axis direction at the other end in the Y-axis direction, thereby individually holding each of the plurality of bus bars 6 arranged in the X-axis direction at the end.

The holding portions 71 adjacent to each other in the X-axis direction are connected to each other. In the bus bar holding member 7 of the present embodiment, a row of holding portions 71 connected in the X-axis direction at one end of the energy storage apparatus 1 in the Y-axis direction, and a row of holding portions 71 connected in the X-axis direction at the other end in the Y-axis direction are connected, that is, integrated. The bus bar holding member 7 is not limited to this configuration. The row of holding portions 71 connected in the X-axis direction at one end in the Y-axis direction and the row of holding portions 71 connected in the X-axis direction at the other end in the Y-axis direction may be separated (separate bodies).

The lid portion 72 closes the opening on one side of the holding portion 71 in the Z-axis direction so as to be openable and closable. The lid portion 72 has a rectangular plate shape that is long in the X-axis direction when viewed from the Z-axis direction. The bus bar holding member 7 of the present embodiment has a plurality of lid portions 72. Each of the plurality of lid portions 72 closes the opening of one holding portion 71 or the openings of the plurality of holding portions 71 arranged in the X-axis direction.

The elastic deformation portion 73 presses a part of the bus bar holding member 7 (the square tubular portion 711 of the holding portion 71) toward the inner side surface 532A by the elastic force caused by the elastic deformation. As shown also in FIGS. 14 and 15, the elastic deformation portion 73 is an elastically deformable portion of the holding portion 71 (square tubular portion 711) extending from a wall 711c facing the outer side surface 360. Specifically, the elastic deformation portion 73 is a long plate-shaped portion, and has an inclined portion 731 that extends from the wall 711c in a direction inclined with respect to the wall 711c (Z-axis direction) and an engaging portion 732 that extends from the tip of the inclined portion 731 and engages with the convex part 335 of the outer side surface 360.

The inclined portion 731 extends in an inclined direction with respect to the wall 711c (Z-axis direction) so as to move away from the wall 711c toward one side in the Z-axis direction. The inclined portion 731 is elastically deformed so as to bend as a whole when a force toward the wall 711c side is applied to the tip (see FIG. 15). In the energy storage apparatus 1 of the present embodiment, the engaging portion 732 is engaged with the convex part 335 of the outer side surface 360 in a state where the inclined portion 731 is bent (in a state where the elastic deformation portion 73 is elastically deformed). That is, the elastic deformation portion 73 is in a state where a force directed outward in the Y-axis direction is applied from the outer side surface 360 to the tip of the inclined portion 731. In this state, a force (elastic force due to elastic deformation) at which the tip of the inclined portion 731 tends to return to the initial position (the position of the tip of the inclined portion 731 with respect to the wall 711c when no force is applied to the inclined portion 731) occurs at the inclined portion 731. Therefore, the wall 711c (holding portion 71) is pressed toward the inner side surface 532A by the elastic deformation portion 73. At this time, since the square tubular portion 711 is in contact with the inner side surface 532A, the movement to the outside in the Y-axis direction is regulated, so that the square tubular portion 711 (bus bar holding member 7) is in a state of being pressed toward the inner side surface 532A.

The engaging portion 732 has a first regulating part 7321 located on both sides or one side of the convex part 335 in the X-axis direction, and a second regulating part 7322 located on both sides or one side of the convex part 335 in the Z-axis direction. Specifically, the engaging portion 732 is a plate-shaped portion extending from the tip of the inclined portion 731, and has a notch 733 extending from the tip toward a base end side (tip side of the inclined portion 731: lower side in FIG. 14).

The notch 733 has a shape corresponding to the other side portion (the portion including the other side end) of the convex part 335 in the Z-axis direction. Specifically, the notch 733 is defined in the X-axis direction by the pair of first regulating parts 7321 extending from the tip of the engaging portion 732 toward the base end side at a position at a distance (slightly larger in the example shown in FIG. 12) corresponding to the dimension of the convex part in the X-axis direction, and the second regulating part 7322 that has a shape (in the example shown in FIG. 12, it extends in the X-axis direction) corresponding to the other end of the convex part 335 in the Z-axis direction and connects the base end side ends of the pair of first regulating parts 7321.

The convex part 335 is fitted into the notch 733, and thereby the engaging portion 732 and the convex part 335 are engaged with each other. At this time, each of both ends of the convex part 335 in the X-axis direction faces the pair of first regulating parts 7321 in a state of abutting on or approaching the corresponding first regulating part 7321 of the pair of first regulating parts 7321. Further, the other end of the convex part 335 in the Z-axis direction faces the second regulating part 7322 in a state of abutting on the second regulating part 7322. Further, in a state where the engaging portion 732 and the convex part 335 are engaged, in the energy storage apparatus 1, the bus bar holding member 7 faces the plurality of energy storage devices 2 in the Z-axis direction via the adjacent member 3 (specifically, the regulating parts 312, 322, 332, etc. of each adjacent member 3).

A plurality of elastic deformation portions 73 configured as described above are arranged at intervals in the X-axis direction. In the bus bar holding member 7 of the present embodiment, the elastic deformation portion 73 is not arranged in all the holding portions 71, but is arranged, for example, every other or every two in a row of the holding portions 71 arranged in the X-axis direction.

According to the above energy storage apparatus 1, even if a manufacturing error or the like occurs in the distance between the bus bar holding member 7 and the adjacent member 3 or the insulator 5, the elastic deformation portion 73 absorbs the manufacturing error by the elastic deformation, and then can press the bus bar holding member 7 toward the adjacent member 3 or the insulator 5 by the elastic force caused by the elastic deformation. More specifically, even if a manufacturing error, an assembly error, or the like occurs in the distance between the pair of facing surfaces (in the example of the present embodiment, the outer side surface 360 and the inner side surface 532A), the elastic deformation portion 73 of the bus bar holding member 7 absorbs the manufacturing error, assembly error, or the like by the elastic deformation, and then can press at least a part of the bus bar holding member 7 (a portion arranged between the pair of facing surfaces: the square tubular portion 711 in the example of the present embodiment) toward the other surface (in the example of the present embodiment, the inner side surface 532A) of the pair of facing surfaces 360 and 532A by the elastic force caused by the elastic deformation. Therefore, rattling of the bus bar holding member 7 in the Y-axis direction (facing direction of the pair of facing surfaces 360 and 532A) is suppressed regardless of the presence or absence of the manufacturing error, assembly error, or the like.

Further, in the energy storage apparatus 1 of the present embodiment, the elastic deformation portion 73 has the pair of first regulating parts 7321 located on both sides in the X-axis direction with respect to the convex part 335 in a state where the convex part 335 is engaged with the elastic deformation portion 73. Therefore, when the bus bar holding member 7 moves or tries to move to each of both sides in the X-axis direction, the movement of the bus bar holding member 7 in the X-axis direction is regulated by the abutting of the convex part 335 on the first regulating part 7321. That is, rattling of the bus bar holding member 7 in the X-axis direction is also suppressed by utilizing the elastic deformation portion 73 that suppresses the rattling in the Y-axis direction.

Further, in the energy storage apparatus 1 of the present embodiment, the elastic deformation portion 73 has the second regulating part 7322 located on the other side in the Z-axis direction with respect to the convex part 335 in a state where the convex part 335 is engaged with the elastic deformation portion 73. Therefore, when the bus bar holding member 7 moves or tries to move to one side in the Z-axis direction, the movement of the bus bar holding member 7 to one side in the Z-axis direction is regulated by the abutting of the convex part 335 on the second regulating part 7322. That is, rattling of the bus bar holding member 7 in the Z-axis direction is also suppressed by utilizing the elastic deformation portion 73 that suppresses the rattling in the Y-axis direction.

Further, in the energy storage apparatus 1 of the present embodiment, the outer side surface 360 with which the elastic deformation portion 73 is in contact in a state of being elastically deformed, and the inner side surface 532A against which the bus bar holding member 7 (holding portion 71) is pressed by the elastic force of the elastic deformation portion 73 are respectively the surfaces 360 and 532A included in members (specifically, the third adjacent member 33 sandwiched between the two energy storage devices 2 and the insulator (insulating member) 5 sandwiched between the plurality of energy storage devices 2 and the holding member 4 that are sandwiched between the members and firmly positioned. Therefore, the rattling of the bus bar holding member 7 in the Y-axis direction is sufficiently suppressed.

Further, in the energy storage apparatus 1 of the present embodiment, when the bus bar 6 is welded to the external terminal 22 of the energy storage device 2, the bus bar 6 can be accurately positioned with respect to the external terminal 22 of each energy storage device 2.

Specifically, with respect to the plurality of energy storage devices 2 held by the holding member 4, the bus bar holding member 7 in a state of holding the plurality of bus bars 6 is attached at positions along the plurality of energy storage devices 2, so that a part of the bus bar holding member 7 (square tubular portion 711) is fitted between the pair of facing surfaces (outer side surface 360 and inner side surface 532A).

At this time, the elastic deformation portion 73 is elastically deformed and the engaging portion 732 is engaged with the convex part 335, so that the bus bar holding member 7 (square tubular portion 711) is pressed against the inner side surface 532A by the elastic force caused by the elastic deformation. Therefore, the bus bar holding member 7 is accurately positioned with respect to each energy storage device 2 in the Y-axis direction. As a result, the corresponding bus bar 6 is accurately positioned in the Y-axis direction with respect to the external terminal 22 of each energy storage device 2.

Further, a state in which the engaging portion 732 is engaged with the convex part 335 and the first regulating parts 7321 are located on both sides of the convex part 335 in the X-axis direction (that is, a state in which the convex part 335 is sandwiched between a pair of the first regulating parts 7321) is brought about, and thereby the bus bar holding member 7 is accurately positioned in the X-axis direction with respect to each energy storage device 2. As a result, the corresponding bus bar 6 is accurately positioned in the X-axis direction with respect to the external terminal 22 of each energy storage device 2.

Further, the bus bar holding member 7 is pushed (pressed) toward the plurality of energy storage devices 2 until the second regulating part 7322 is located on the other side in the Z-axis direction from the convex part 335, the engaging portion 732 is engaged with the convex part 335, and thereby the bus bar holding member 7 is accurately positioned in the Z-axis direction with respect to each energy storage device 2. As a result, the corresponding bus bar 6 is accurately positioned in the Z-axis direction with respect to the external terminal 22 of each energy storage device 2.

As described above, the bus bar holding member 7 in the state of holding the plurality of bus bars 6 is attached to the positions along the plurality of energy storage devices 2, and thereby a state in which the corresponding bus bar 6 is accurately positioned with respect to the external terminal 22 of each energy storage device 2 in all directions of the X-axis direction, Y-axis direction, and Z-axis direction is brought about. As a result, positional displacement of the bus bar 6 with respect to the external terminal 22 when the bus bar 6 is welded to each external terminal 22 is suppressed, and as a result, occurrence of welding defects due to the positional displacement is suppressed.

Note that, the energy storage apparatus of the present invention is not limited to the above-described embodiment, and it goes without saying that various modifications can be made within a range not departing from the gist of the present invention. For example, a configuration of another embodiment can be added to a configuration of one embodiment, and a part of the configuration of one embodiment can be replaced with the configuration of another embodiment. In addition, a part of the configuration of one embodiment can be deleted.

The specific configuration of the elastic deformation portion 73 in the bus bar holding member 7 is not limited. For example, the elastic deformation portion 73 may include a part (wall 711c) of the square tubular portion 771. Specifically, as shown in FIGS. 16(A) to 17(B), the engaging portion 732 of the elastic deformation portion 73 is engaged with the convex part 335 of the outer side surface 360 to push the connection portion of the wall 711c with the inclined portion 731 to the outside in the Y-axis direction, and thereby the wall 711c elastically deforms. The elastic force caused by this elastic deformation presses the bus bar holding member 7 against the inner side surface 532A.

Figure 18:
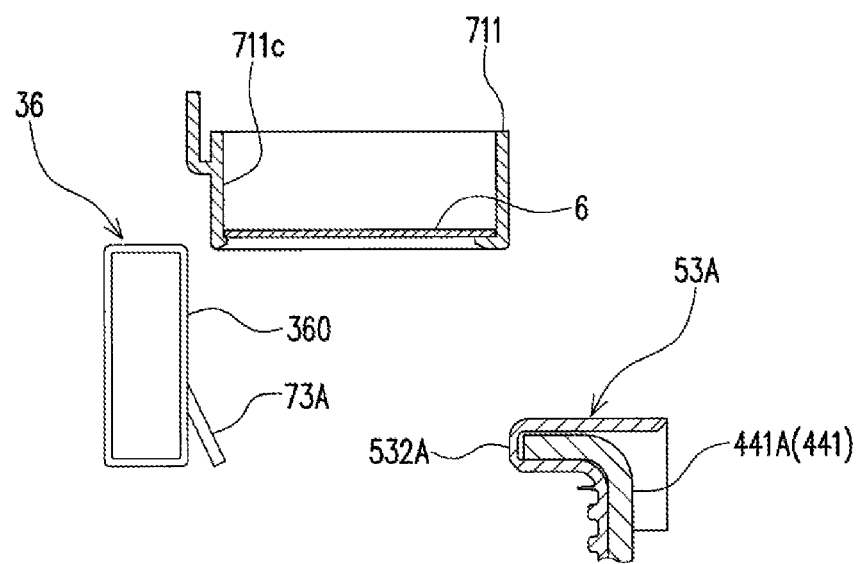
FIG. 18 is a cross-sectional view for explaining an elastic deformation portion according to another embodiment.
Figure 18:
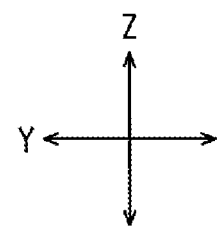
Figure 19:
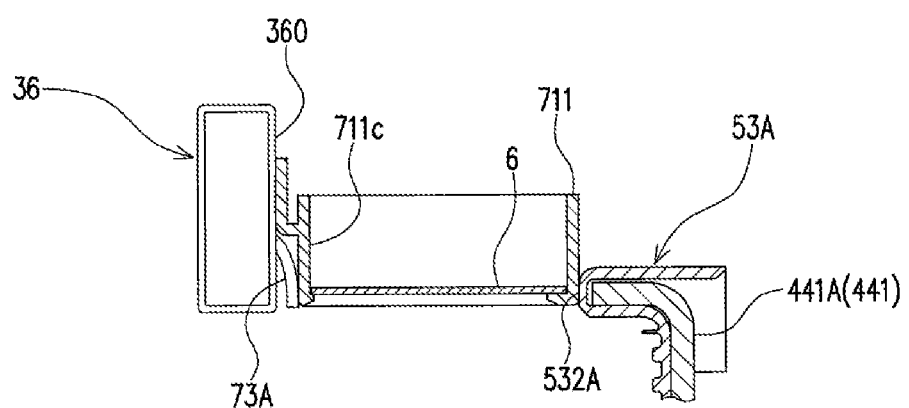
FIG. 19 is a cross-sectional view for explaining an elastic deformation portion according to another embodiment.

Further, the elastic deformation portion 73 of the above embodiment is a part of the bus bar holding member 7, but is not limited to this configuration. The elastic deformation portion 73 may be a part of a member other than the bus bar holding member 7, or may be an independent member. For example, as shown in FIGS. 18 and 19, an elastic deformation portion 73A may be provided on a wall portion 36 (adjacent member 3). Further, in FIGS. 20 and 21, an elastic deformation portion 73B may be provided on the lid plate side covering portion 53A (insulator 5). For example, specifically, the elastic deformation portion 73B (tip portion 532) in a state where the bus bar holding member 7 is not arranged is curved so as to be convex inward in the Y-axis direction, and when the bus bar holding member 7 is arranged, it is pushed by the square tubular portion 711 and elastically deforms. As a result, the elastic deformation portion 73B presses the square tubular portion 711 against the outer side surface 360 by the elastic force caused by the elastic deformation.

Figure 20:
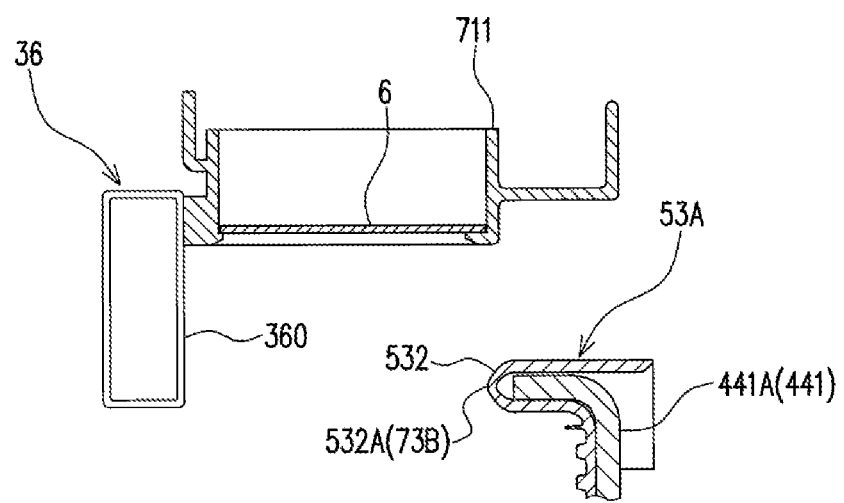
FIG. 20 is a cross-sectional view for explaining an elastic deformation portion according to another embodiment.
Figure 21:
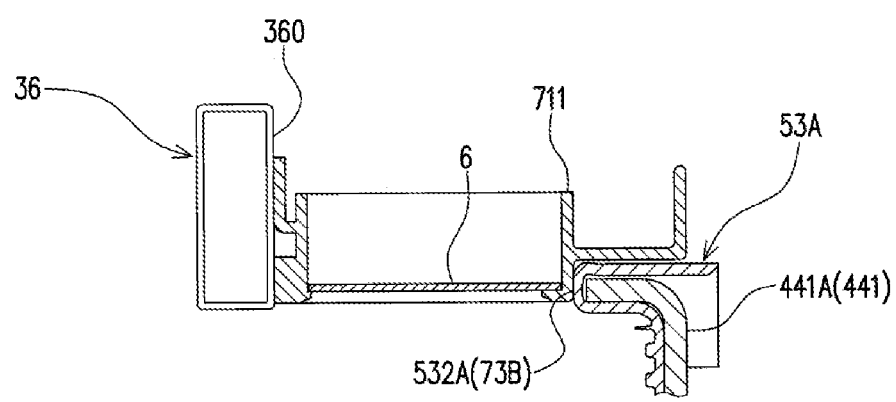
FIG. 21 is a cross-sectional view for explaining an elastic deformation portion according to another embodiment.
Figure 21:
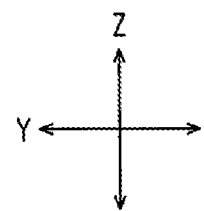
Figure 22:
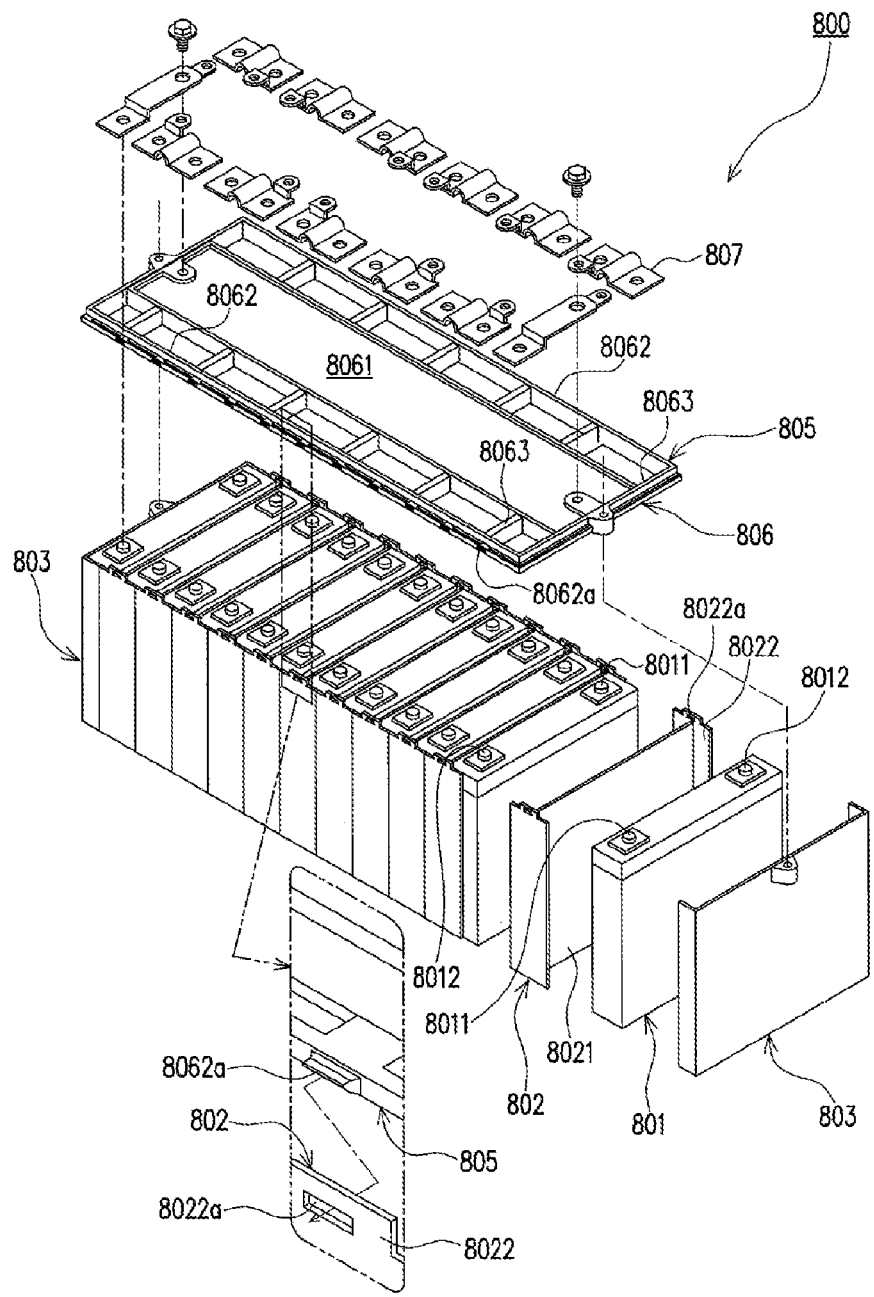
FIG. 22 is an exploded perspective view of a conventional battery module.

Further, as shown in FIGS. 20 and 21, the elastic deformation portion 73B may have a configuration in which a pair of facing surfaces located on both sides of at least a part of the bus bar holding member 7 is included in the surface thereof.

That is, in a state where the bus bar holding member 7 is assembled at positions along a plurality of energy storage devices 2 in the energy storage apparatus 1, it is sufficient that each of the elastic deformation portions 73, 73A, and 73B has a configuration of pressing at least a part of the bus bar holding member 7 toward one of a pair of facing surfaces.

In the energy storage apparatus 1 of the above embodiment, one surface (outer side surface 360 in the example of the above embodiment) and the other surface (inner side surface 532A in the example of the above embodiment) of a pair of facing surfaces arranged on both sides of at least a part of the bus bar holding member 7 are included in different members (in the example of the above embodiment, the third adjacent member 33 and the insulator 5), but the configuration is not limited to this. Each of the pair of facing surfaces may be included in the same member (common member). Further, each of the pair of facing surfaces may be included in a member other than the adjacent member 3 and the insulator 5.

Further, in the energy storage apparatus 1 of the above embodiment, the elastic deformation portion 73 is in contact with the outer side surface 360 in a state of being elastically deformed, and the square tubular portion 711 is in contact with the inner side surface 532A, but the configuration is not limited to this. The elastic deformation portion 73 may be in contact with the inner side surface 532A in a state of being elastically deformed, and the square tubular portion 711 may be in contact with the outer side surface 360.

Further, in the energy storage apparatus 1 of the above embodiment, the pair of facing surfaces arranged on both sides of at least a part of the bus bar holding member 7 face each other in the Y-axis direction, but the configuration is not limited to this. The facing direction of the pair of facing surfaces may be any direction. That is, the facing direction of the pair of facing surfaces may be the X-axis direction or the Z-axis direction, and may not match the respective axial directions of the Cartesian coordinate system used in the above embodiment.

Further, in the energy storage apparatus 1 of the above embodiment, a part 711 of the bus bar holding member 7 is located between the pair of facing surfaces 360 and 532A, but the configuration is not limited to this. The entire bus bar holding member 7 may be located between the pair of facing surfaces 360 and 532A.

In the engaging portion 732 of the elastic deformation portion 73 of the above embodiment, the second regulating part 7322 exists only on the other side in the Z-axis direction when engaged with the convex part 335, but the configuration is not limited to this. For example, the second regulating part 7322 may exist on one side of the convex part 335 in the Z-axis direction by providing a hole or the like through which the convex part 335 is fitted in the engaging portion 732. In this case, the second regulating part 7322 may be provided on both sides in the Z-axis direction, or may be provided on only one side.

Further, in the elastic deformation portion 73 of the above embodiment, the engaging portion 732 has a pair of first regulating parts 7321, but the configuration is not limited to this. The first regulating part 7321 may be provided on one side of the convex part 335. For example, in the case where the first regulating part 7321 is provided on only one side of the convex part 335 in the X-axis direction, when the bus bar holding member 7 moves or tries to move to one side in the X-axis direction, the abutting of the convex part 335 on the first regulating part 7321 regulates the movement to one side in the X-axis direction. As a result, the rattling of the bus bar holding member 7 in the X-axis direction is suppressed as compared with the configuration without the first regulating part 7321.

The invention claimed is:

1. An energy storage apparatus, comprising:
    a plurality of energy storage devices arranged in a first direction;
    an adjacent member sandwiched between two adjacent energy storage devices among the plurality of energy storage devices;
    a holding member that holds the plurality of energy storage devices and the adjacent member, the holding member including:
        a pair of termination members arranged on both sides of the plurality of energy storage devices in the first direction; and
        a pair of connecting members arranged on both sides of the plurality of energy storage devices in a second direction orthogonal to the first direction, and connecting the pair of termination members;
    an insulating member interposed between the plurality of energy storage devices and one of the pair of connecting members;
    a bus bar that electrically connects external terminals of the energy storage devices; and
    a bus bar holding member that holds the bus bar, is arranged along the plurality of energy storage devices, and is made of resin,
    wherein the bus bar holding member includes an elastic deformation portion and projects toward one of the adjacent member and the insulating member, and
    wherein the elastic deformation portion contacts the one of the adjacent member and the insulating member, and contacts the bus bar holding member against an other of the adjacent member and the insulating member.

2. The energy storage apparatus according to claim 1, wherein the adjacent member has a convex part, and
    wherein the elastic deformation portion has a first regulating part that is located beside the convex part in the first direction and thereby regulates movement of the bus bar holding member in the first direction.

3. The energy storage apparatus according to claim 1, wherein the adjacent member has a convex part, and
    wherein the elastic deformation portion has a second regulating part that is located beside the convex part in the second direction that is a direction in which the bus bar and the energy storage device are arranged and is a direction orthogonal to the first direction, and thereby regulates movement of the bus bar holding member in the second direction.

4. The energy storage apparatus according to claim 2, wherein the adjacent member has a main body portion located between the two adjacent energy storage devices and an extension portion extending from a peripheral edge of the main body portion,
    wherein the convex part is arranged on the extension portion, and
    wherein the elastic deformation portion contacts the convex part and contacts the bus bar holding member against the adjacent member.

5. The energy storage apparatus according to claim 1, wherein the elastic deformation portion abuts on one of the adjacent member and the insulating member, and presses the bus bar holding member against the other of the adjacent member and the insulating member.

6. The energy storage apparatus according to claim 1, wherein the elastic deformation portion is disposed in contact with the bus bar holding member in a state of being elastically deformed.

7. The energy storage apparatus according to claim 5, wherein the elastic deformation portion is disposed in contact with the bus bar holding member in a state of being elastically deformed.

8. The energy storage apparatus according to claim 1, wherein the elastic deformation portion includes:
    an inclined portion that extends from a wall of the bus bar holding member in a direction inclined with respect to the wall; and
    an engaging portion that extends from a tip of the inclined portion.

9. The energy storage apparatus according to claim 2, wherein the elastic deformation portion includes:
    an inclined portion that extends from a wall of the bus bar holding member in a direction inclined with respect to the wall; and
    an engaging portion that extends from a tip of the inclined portion and engages with the convex part of the adjacent member.

10. The energy storage apparatus according to claim 8, wherein the inclined portion is elastically deformed so as to bend as a whole when a force toward the wall side is applied to the tip of the inclined portion.

11. The energy storage apparatus according to claim 9, wherein the inclined portion is elastically deformed so as to bend as a whole when a force toward the wall side is applied to the tip of the inclined portion.

12. The energy storage apparatus according to claim 1, wherein the bus bar holding member includes at least a second elastic deformation portion.

13. An energy storage apparatus, comprising:
    a plurality of energy storage devices arranged in a first direction;
    an adjacent member sandwiched between two adjacent energy storage devices among the plurality of energy storage devices;
    a holding member that holds the plurality of energy storage devices and the adjacent member, the holding member including:
        a pair of termination members arranged on both sides of the plurality of energy storage devices in the first direction; and
        a pair of connecting members arranged on both sides of the plurality of energy storage devices in a second direction orthogonal to the first direction, and connecting the pair of termination members;

an insulating member interposed between the plurality of energy storage devices and one of the pair of connecting members;

a bus bar that electrically connects external terminals of the energy storage devices; and a bus bar holding member that holds the bus bar, is arranged along the plurality of energy storage devices, and is made of resin, wherein the adjacent member includes an elastic deformation portion that projects toward the bus bar holding member, and wherein the elastic deformation portion contacts the bus bar holding member and contacts the bus bar holding member against the insulating member.

14. The energy storage apparatus according to claim 13, wherein the elastic deformation portion abuts on the bus bar holding member and presses the bus bar holding member against the insulating member.

15. The energy storage apparatus according to claim 14, wherein the elastic deformation portion is disposed in contact with the bus bar holding member in a state of being elastically deformed.

16. The energy storage apparatus according to claim 13, wherein the elastic deformation portion includes:
   an inclined portion that extends from a wall of the bus bar holding member in a direction inclined with respect to the wall; and
   an engaging portion that extends from a tip of the inclined portion.

17. An energy storage apparatus, comprising:
   a plurality of energy storage devices arranged in a first direction;
   an adjacent member sandwiched between two adjacent energy storage devices among the plurality of energy storage devices;
   a holding member that holds the plurality of energy storage devices and the adjacent member, the holding member including:
      a pair of termination members arranged on both sides of the plurality of energy storage devices in the first direction; and
      a pair of connecting members arranged on both sides of the plurality of energy storage devices in a second direction orthogonal to the first direction, and connecting the pair of termination members;
   an insulating member interposed between the plurality of energy storage devices and one of the pair of connecting members;
   a bus bar that electrically connects external terminals of the energy storage devices; and
   a bus bar holding member that holds the bus bar, is arranged along the plurality of energy storage devices, and is made of resin,
   wherein the insulating member includes an elastic deformation portion that projects toward the bus bar holding member, and
   wherein the elastic deformation portion contacts the bus bar holding member and contacts the bus bar holding member against the adjacent member.

18. The energy storage apparatus according to claim 17, wherein the elastic deformation portion abuts on the bus bar holding member and presses the bus bar holding member against the adjacent member.

19. The energy storage apparatus according to claim 18, wherein the elastic deformation portion is disposed in contact with the bus bar holding member in a state of being elastically deformed.

20. The energy storage apparatus according to claim 17, wherein the elastic deformation portion includes:
   an inclined portion that extends from a wall of the bus bar holding member in a direction inclined with respect to the wall; and
   an engaging portion that extends from a tip of the inclined portion.

* * * * *